US009658517B2

(12) United States Patent
McElderry

(10) Patent No.: US 9,658,517 B2
(45) Date of Patent: May 23, 2017

(54) CAMERA MOUNTING DEVICE

(71) Applicant: CAM CADDIE, Glendale, CA (US)

(72) Inventor: Daniel McElderry, Glendale, CA (US)

(73) Assignee: CAM CADDIE, Alhambra, CA (US)

( * ) Notice: Subject to any disclaimer, the term of this patent is extended or adjusted under 35 U.S.C. 154(b) by 0 days.

(21) Appl. No.: 14/777,076

(22) PCT Filed: Mar. 15, 2014

(86) PCT No.: PCT/US2014/030059
§ 371 (c)(1),
(2) Date: Sep. 15, 2015

(87) PCT Pub. No.: WO2014/145320
PCT Pub. Date: Sep. 18, 2014

(65) Prior Publication Data
US 2016/0041454 A1  Feb. 11, 2016

Related U.S. Application Data

(60) Provisional application No. 61/800,238, filed on Mar. 15, 2013.

(51) Int. Cl.
| G03B 17/56 | (2006.01) |
| F16M 11/04 | (2006.01) |
| F16M 11/14 | (2006.01) |
| F16M 11/38 | (2006.01) |
| F16C 11/06 | (2006.01) |
| F16C 11/10 | (2006.01) |
| H04N 5/225 | (2006.01) |
| F16M 13/04 | (2006.01) |
| F16M 13/00 | (2006.01) |

(52) U.S. Cl.
CPC ............ *G03B 17/561* (2013.01); *F16C 11/06* (2013.01); *F16C 11/10* (2013.01); *F16M 11/041* (2013.01); *F16M 11/14* (2013.01); *F16M 11/38* (2013.01); *F16M 13/00* (2013.01); *F16M 13/04* (2013.01); *G03B 17/566* (2013.01); *H04N 5/2251* (2013.01)

(58) Field of Classification Search
CPC ............................ G03B 17/561; G03B 17/563
See application file for complete search history.

(56) References Cited

U.S. PATENT DOCUMENTS 3,618,805 A * 11/1971 Meller ................ B65D 88/522
217/16
5,544,968 A    8/1996 Goellner
(Continued)

Primary Examiner — Clayton E Laballe
Assistant Examiner — Noam Reisner
(74) Attorney, Agent, or Firm — Cotman IP Law Group, PLC

(57) ABSTRACT

The present disclosure describes a device for mounting a camera and methods of using the same. The device comprises one or more mounting segments, preferably two or more mounting segments which may preferably be connected together. In preferred embodiments, the device further comprises one fastener-free mounting segment and one or more fastener-enabled mounting segments, wherein a fastener-enabled mounting segment comprises a mounting brace, a fastener, a mounting nut, and a mounting spacer, and wherein a fastener-free mounting segment comprises a mounting brace.

18 Claims, 58 Drawing Sheets

(56) References Cited

U.S. PATENT DOCUMENTS

| | | | | |
|---|---|---|---|---|
| 6,135,851 A | * | 10/2000 | Drake | A63H 33/062 273/243 |
| 7,380,759 B1 | | 6/2008 | Whiteside et al. | |
| 7,753,330 B2 | | 7/2010 | Brief | |
| 2009/0060473 A1 | * | 3/2009 | Kohte | F16M 11/041 386/200 |
| 2011/0129210 A1 | * | 6/2011 | McGucken | F16M 13/02 396/422 |
| 2012/0247012 A1 | * | 10/2012 | Johnson | E04H 17/166 47/32.4 |
| 2013/0004153 A1 | * | 1/2013 | McKee | F16M 11/041 396/420 |

* cited by examiner

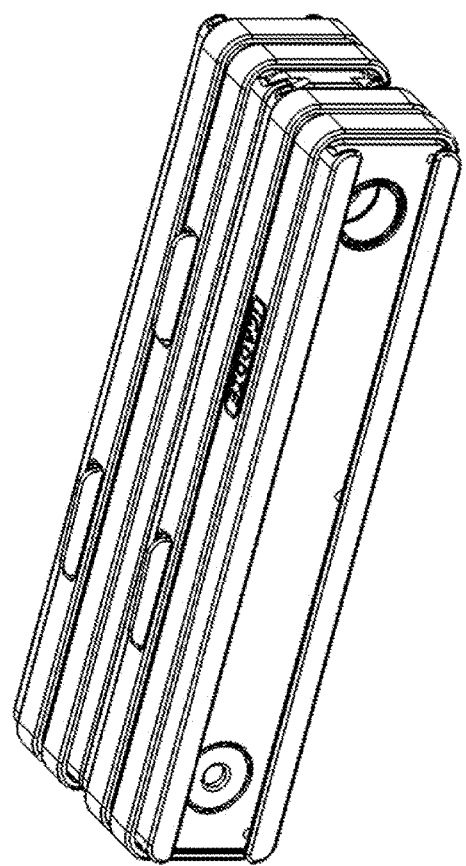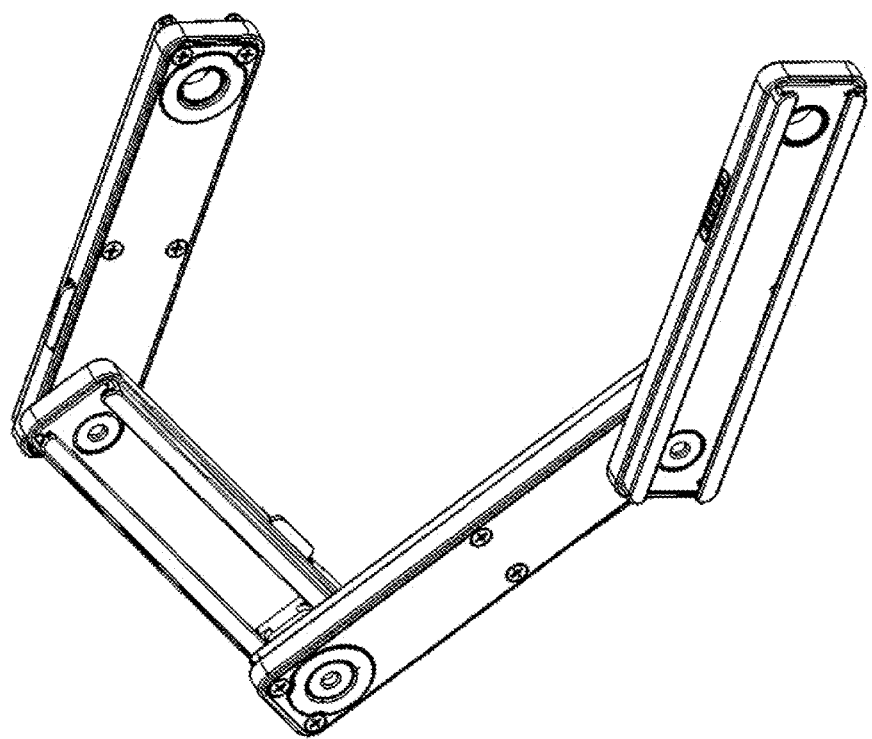
FIG. 5

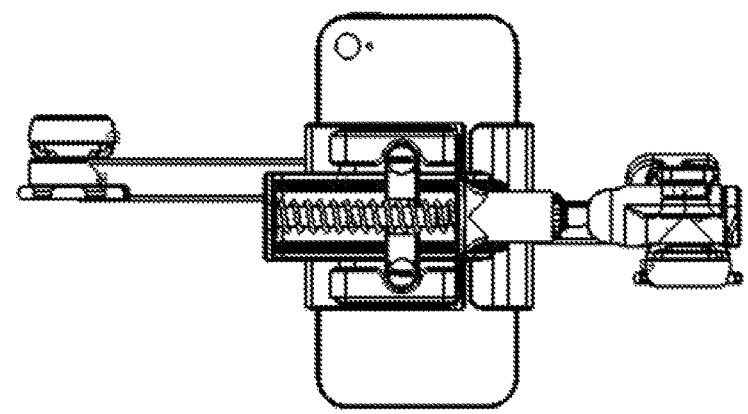
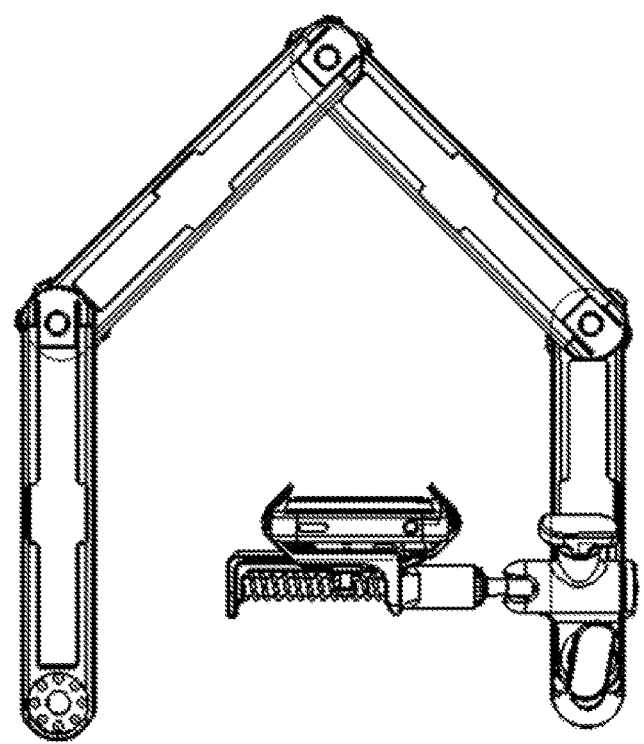
FIG. 13

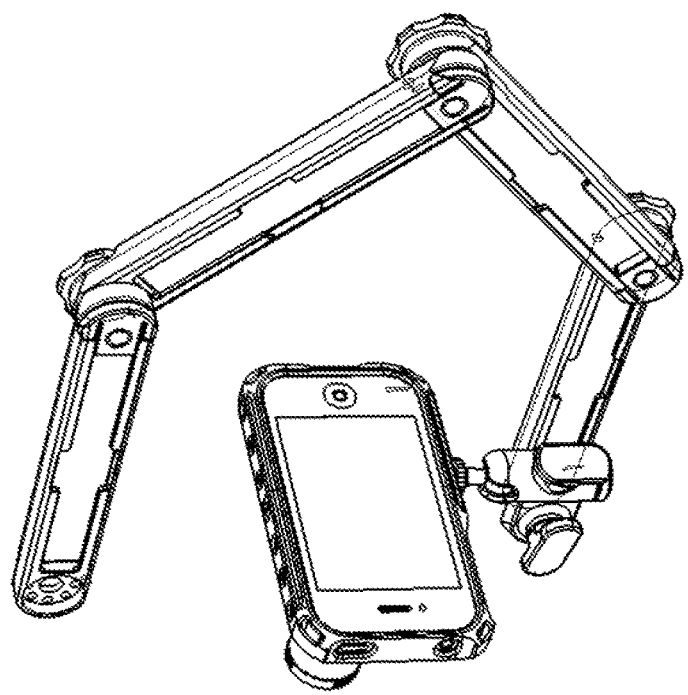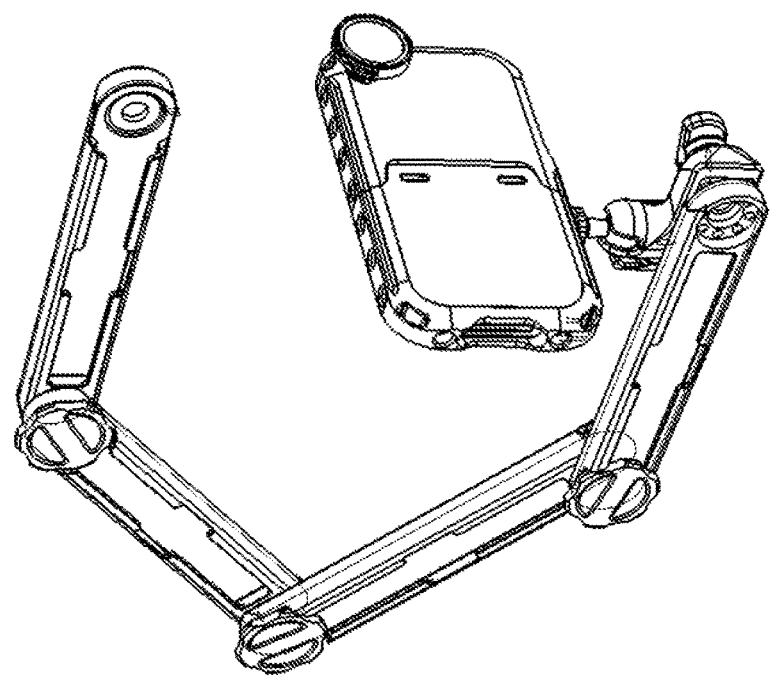
FIG. 14

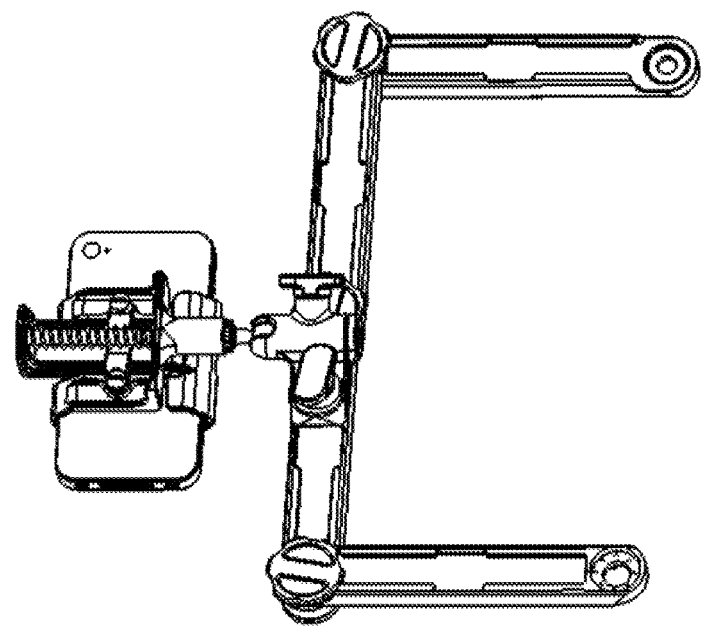
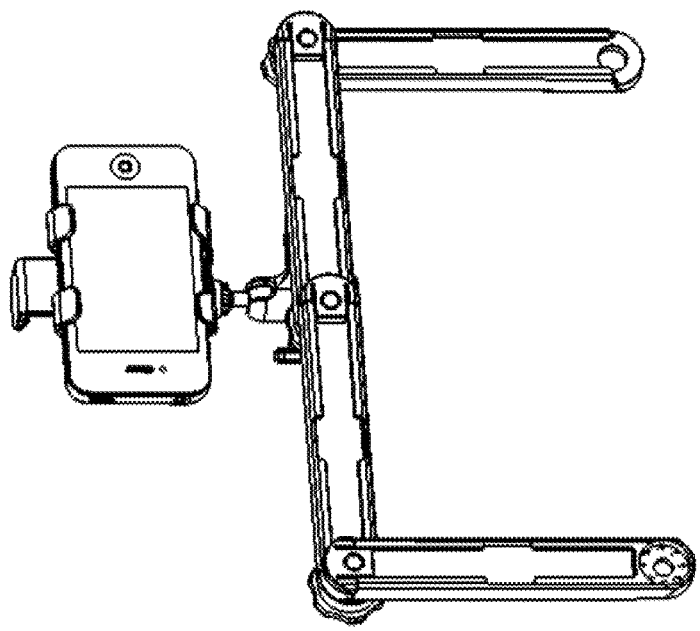
FIG. 17

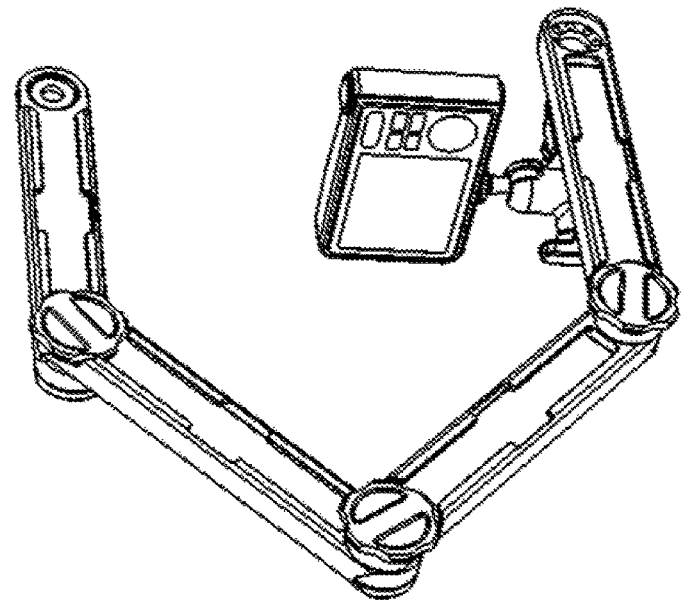
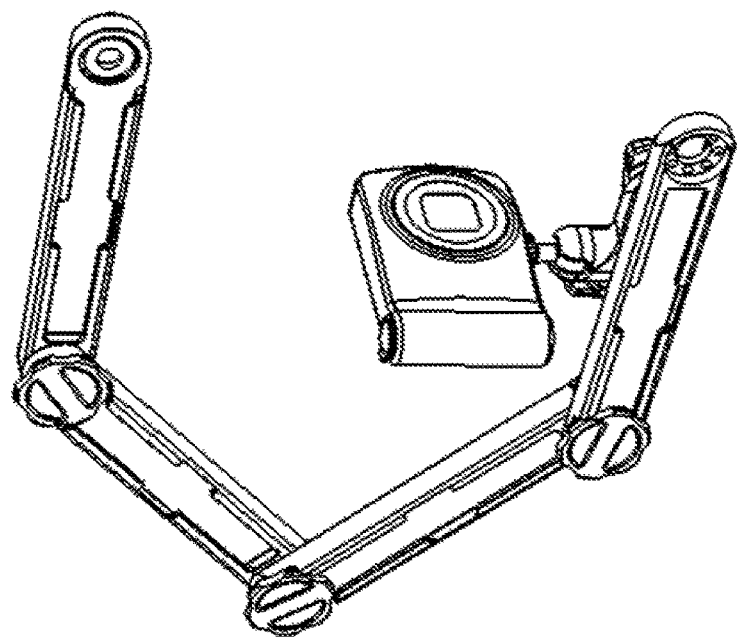
FIG. 29

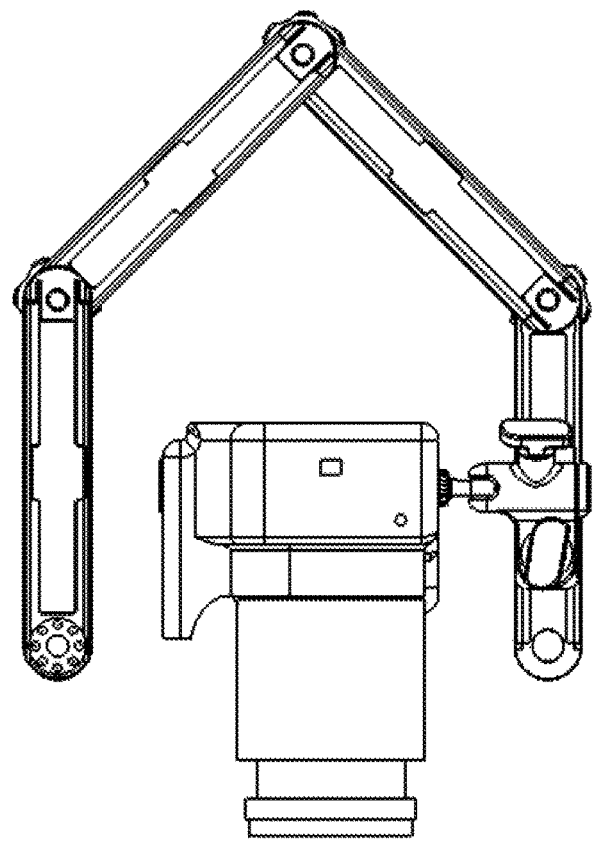
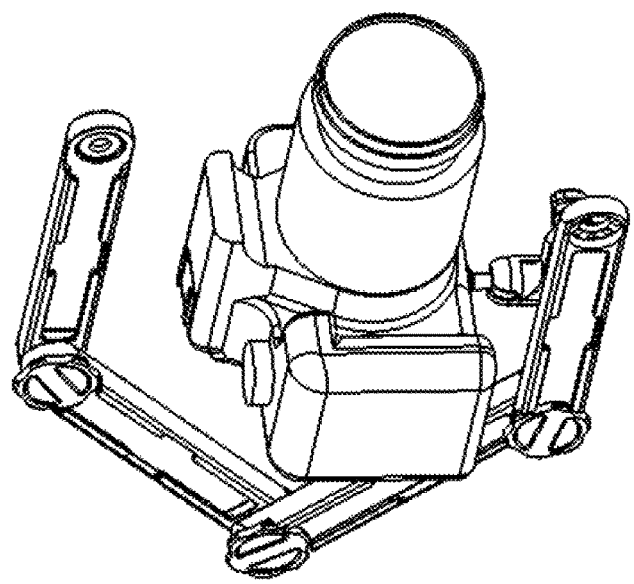
FIG. 30

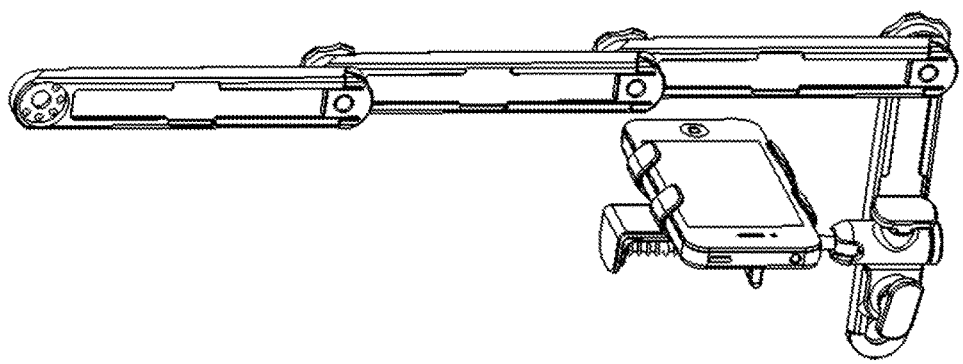
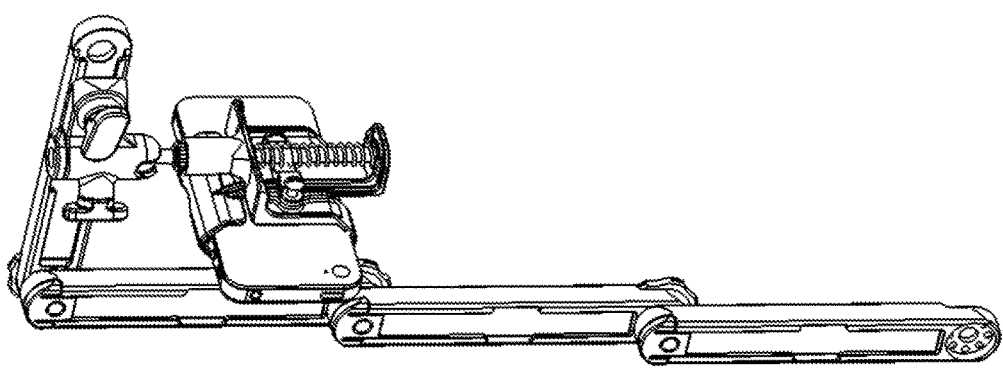
FIG. 31

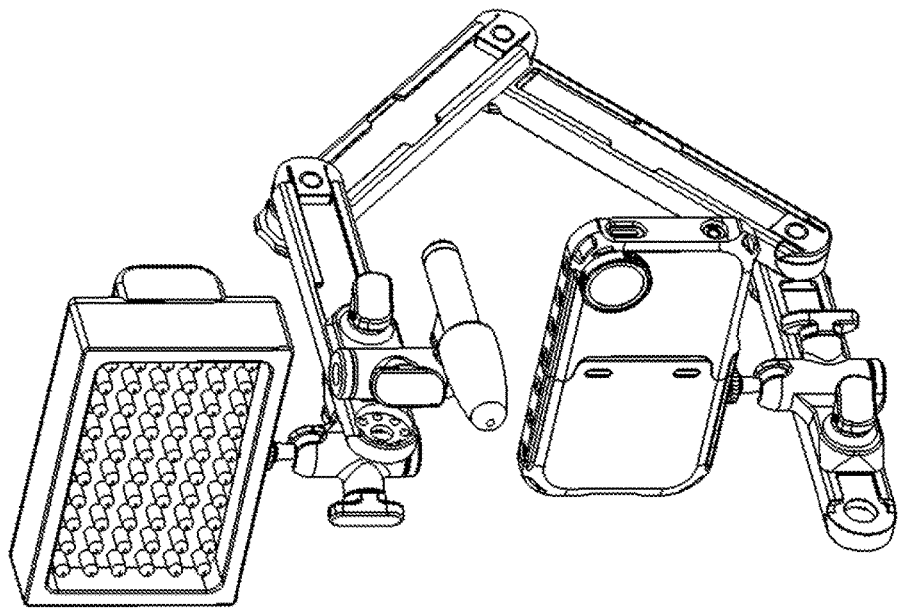
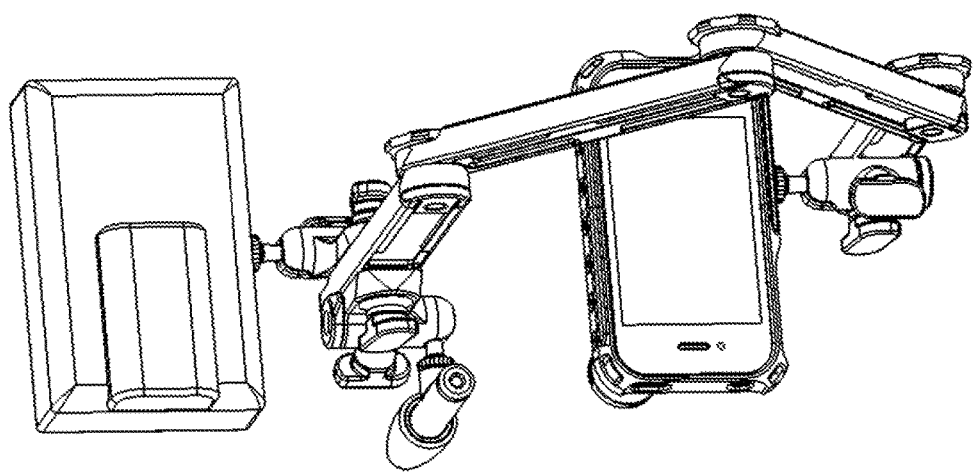
FIG. 42

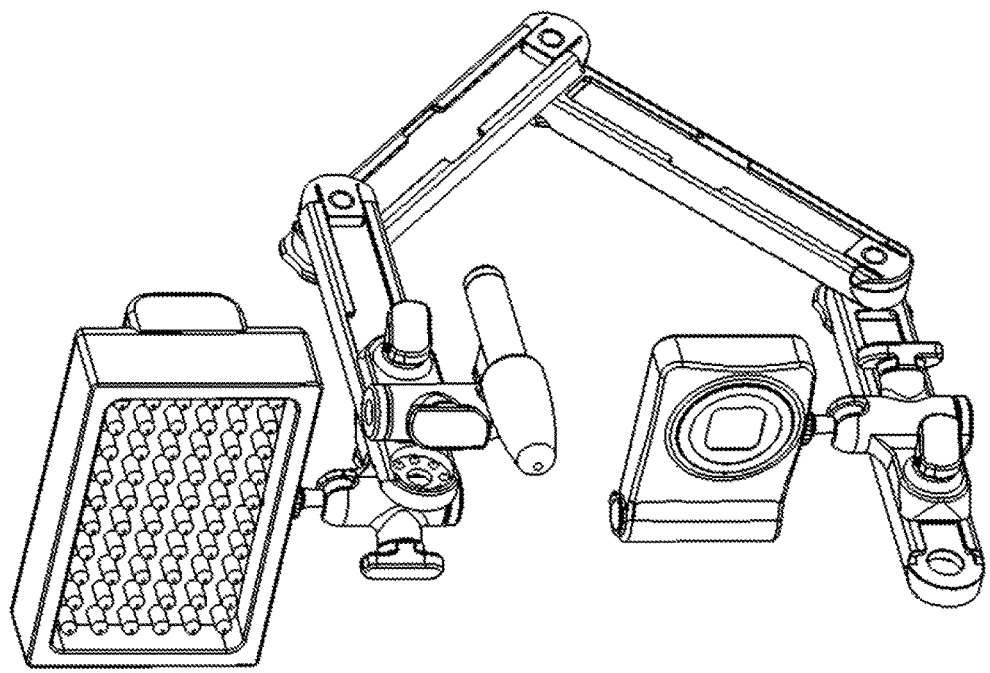
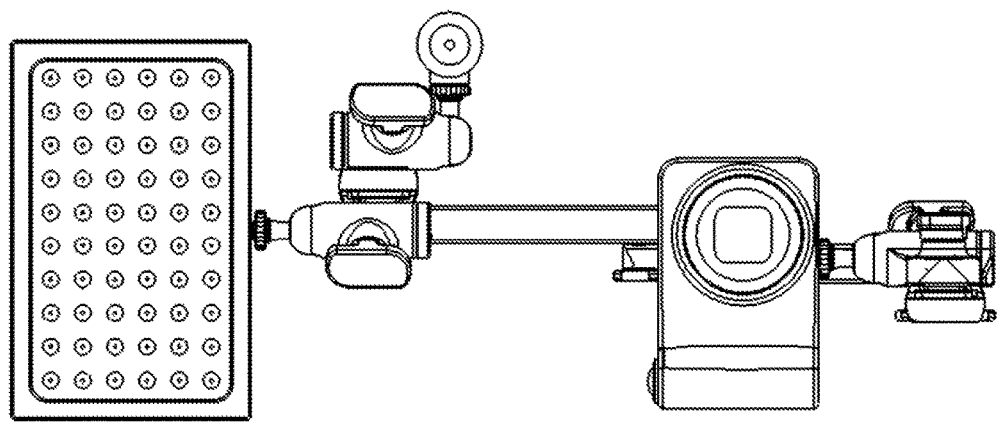
FIG. 43

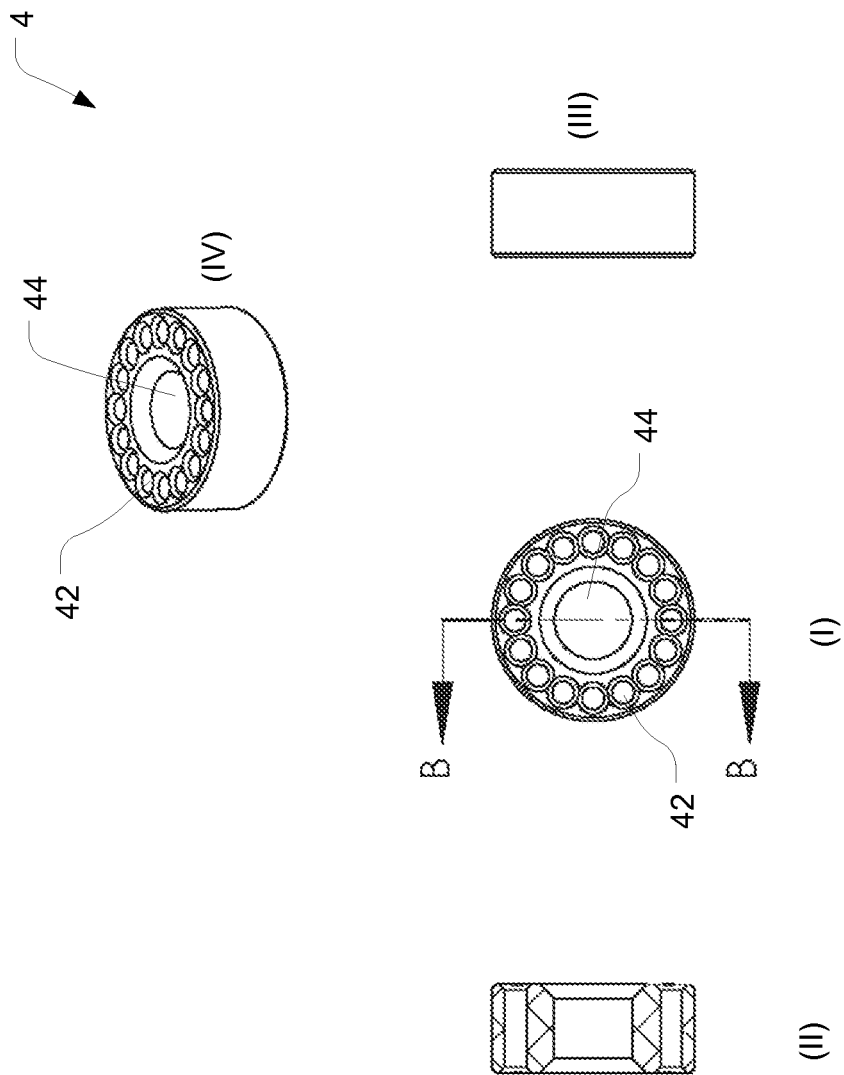

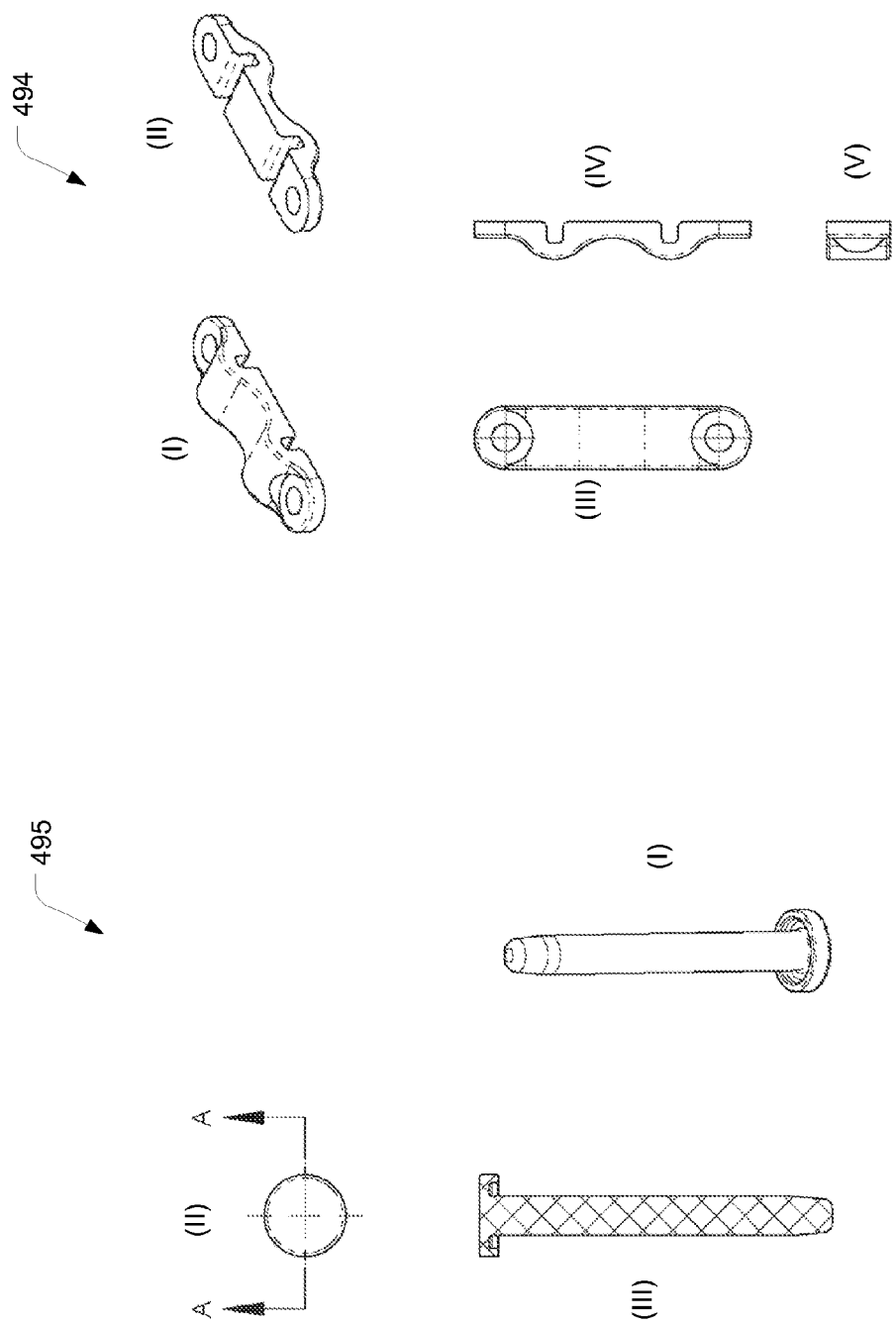

CAMERA MOUNTING DEVICE

CROSS-REFERENCE TO RELATED APPLICATIONS

This application claims priority to U.S. Provisional Patent Appl. No. 61/800,238, filed on Mar. 15, 2013, the disclosure of which is incorporated herein in its entirety by reference.

BACKGROUND

Field of the Invention

The present disclosure relates to devices for mounting a camera and methods of using the same.

Description of the Related Art

Digital cameras were first invented nearly forty years ago, and have eventually become the dominant technology in consumer photography.[1] In addition to stand-alone devices such as compact digital cameras and digital single lens reflex (DSLR) cameras, digital cameras have now become commonplace as integrated elements of portable electronic devices such as cellular phones, smart phones, and tablets. Both stand-alone digital cameras and integrated digital cameras are now capable of recording videos as well. Stand-alone cameras have a well-developed array of accessories for use therewith, such as electronic flash units, constant lighting sources, microphones and other recording devices, and tripods and other mounting devices. By contrast, integrated digital cameras on portable electronic devices do not have a similar array of available accessories for use therewith.

[1] http://en.wikipedia.org/wiki/digital_camera

Integrated digital cameras on portable electronic devices such as cellular phones, smart phones, and tablets are useful in part because of the multi-functionality and portability of these devices. Thus, when in possession of such a device an individual does not have to have a stand-alone camera available whenever an occasion or opportunity for photography or videography arises. However, this also limits the utility of integrated digital cameras, as the user does not have access to accessories that can enhance the user's photography or videography like those available for stand-alone cameras. While the quality of photographs and videos generated using integrated digital cameras is rapidly increasing, the lack of available accessories still limits the use of such cameras to certain types of situations. The unavailability of accessories for mounting integrated digital cameras limits the use and effectiveness of such cameras in capturing many types of images and video recordings.

Thus there remains a need for a portable device that enables users to mount or otherwise secure integrated digital cameras while taking photographs and generating video recordings.

SUMMARY

The present disclosure describes a device for mounting a camera and methods of using the same. The device comprises one or more mounting segments, preferably two or more mounting segments which may preferably be connected together. In preferred embodiments, the device comprises a mounting brace, a fastener, a mounting nut, and a mounting spacer. In highly preferred embodiments, the mounting brace comprises two terminal holes and a mounting channel comprising a spring clamp fixation site and one or more threaded holes, the fastener comprises a threaded extension member, the spacer comprises a hole that will accommodate the threaded extension member and a plurality of lock points that allow for incremental adjustment of the mounting segment with respect to an adjacent mounting segment, and the mounting nut comprises a threaded hole that will accommodate the threaded extension member. In highly preferred embodiments, the mounting channel has about the same dimensions as a traditional camera flash shoe.

BRIEF DESCRIPTION OF THE DRAWINGS

FIG. 5 shows a spring/release embodiment of the device.

FIG. 13 shows a scorpion configuration of a preferred embodiment of the device securing a smart phone integrated digital camera.

FIG. 14 shows a scorpion configuration of a preferred embodiment of the device securing a smart phone integrated digital camera.

FIG. 17 shows a C configuration of a preferred embodiment of the device securing a smart phone integrated digital camera.

FIG. 29 shows a scorpion configuration of a preferred embodiment of the device securing a stand-alone digital camera.

FIG. 30 shows a scorpion configuration of a preferred embodiment of the device securing a stand-alone DSLR camera.

FIG. 31 shows an L configuration of a preferred embodiment of the device securing a smart phone integrated digital camera.

FIG. 42 shows a scorpion configuration of a preferred embodiment of the device securing a smart phone integrated digital camera and an accessory.

FIG. 43 shows a scorpion configuration of a preferred embodiment of the device securing a stand-alone digital camera and an accessory.

FIG. 47C are illustrations of different views of a spacer locker in accordance with an embodiment of the present invention.

FIG. 49D presents different views of the spring guide of the exemplary spring clamp.

FIG. 49E presents different views of the retainer of the exemplary spring clamp.

DETAILED DESCRIPTION OF THE PREFERRED EMBODIMENTS

The present disclosure describes a device for mounting a camera and methods of using the same. The device comprises one or more mounting segments, preferably two or more mounting segments wherein each mounting segment is connected to one or two other mounting segments.

Figure 1:
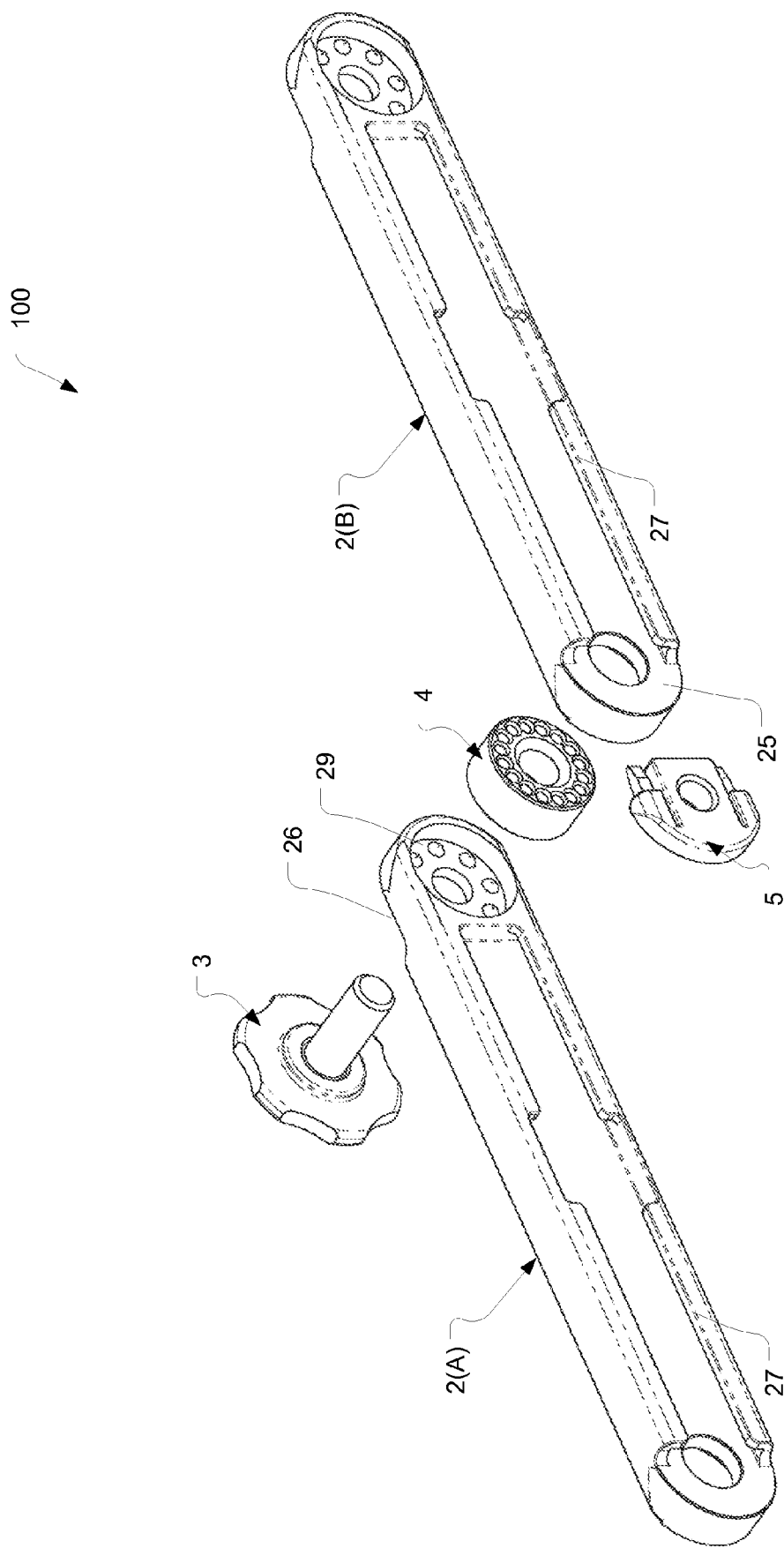
FIG. 1 is an illustration of an exploded view of a camera mounting device in accordance with a preferred embodiment of the present invention.

In preferred embodiments, each mounting segment may be connected to one or two other mounting segments using a fastener. In preferred embodiments, the device comprises a plurality of mounting segments. In preferred embodiments, a camera mounting device of the present invention comprises a plurality of mounting segments 2 coupled together with one or more thumb screw fastener 3, one or more mounting spacer locker 4, and one or more threaded end cap 5. An exploded view of a camera mounting device of the present invention is shown in FIG. 1.

Figure 47A:
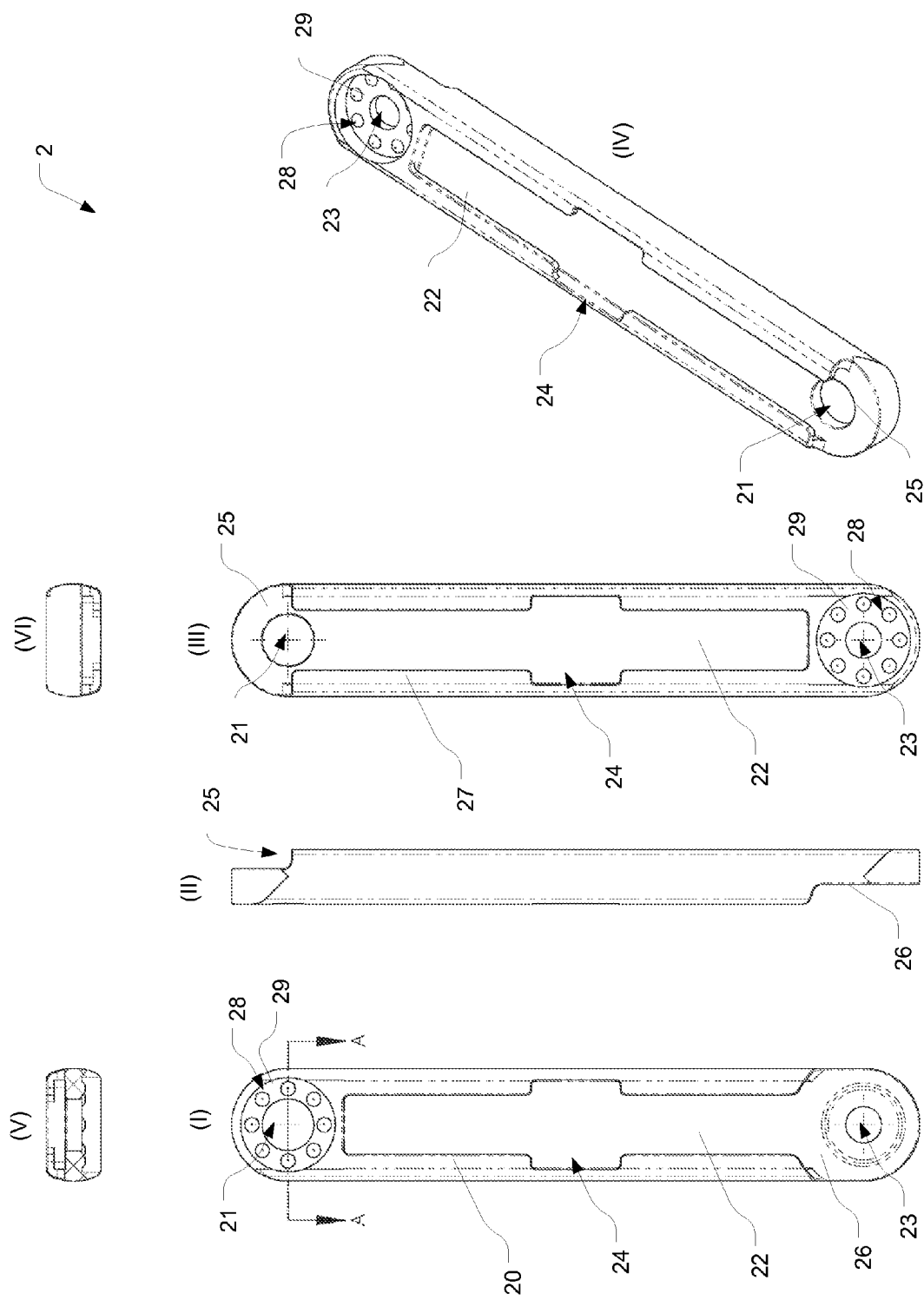
FIG. 47A presents different views of a mounting segment in accordance with an embodiment of the present invention.

FIG. 47A presents different views of a mounting segment in accordance with an embodiment of the present invention as follows: (I) is an illustration of the front side elevational view; (II) is an illustration of the left or right side elevational view; (III) is an illustration of the backside elevational view; (IV) is an illustration of the perspective view; (V) is an illustration of the top side elevational view; and (VI) is an illustration of the bottom side elevational view.

Figure 47B:
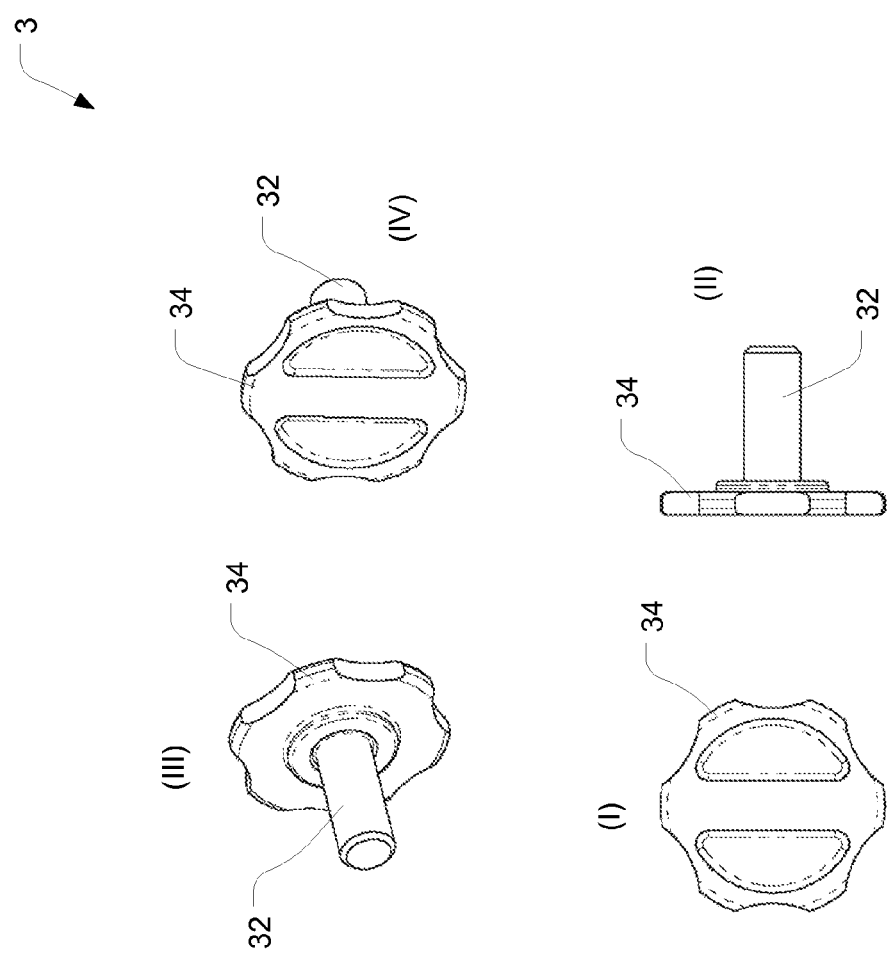
FIG. 47B are illustrations of different views of a thumb screw fastener in accordance with an embodiment of the present invention.

FIG. 47B are illustrations of different views of a thumb screw fastener in accordance with an embodiment of the present invention as follows: (I) is an illustration of the top side elevational view; (II) is an illustration of a side elevational view; (III) is an illustration of a front side perspective view; and (IV) is an illustration of a back side perspective view.

FIG. 47C are illustrations of different views of a spacer locker in accordance with an embodiment of the present invention as follows: (I) is an illustration of the top side elevational view; (II) is a view of cross-section B-B; (III) is an illustration of a side elevational view; and (IV) is an illustration of a perspective view.

Figure 47D:
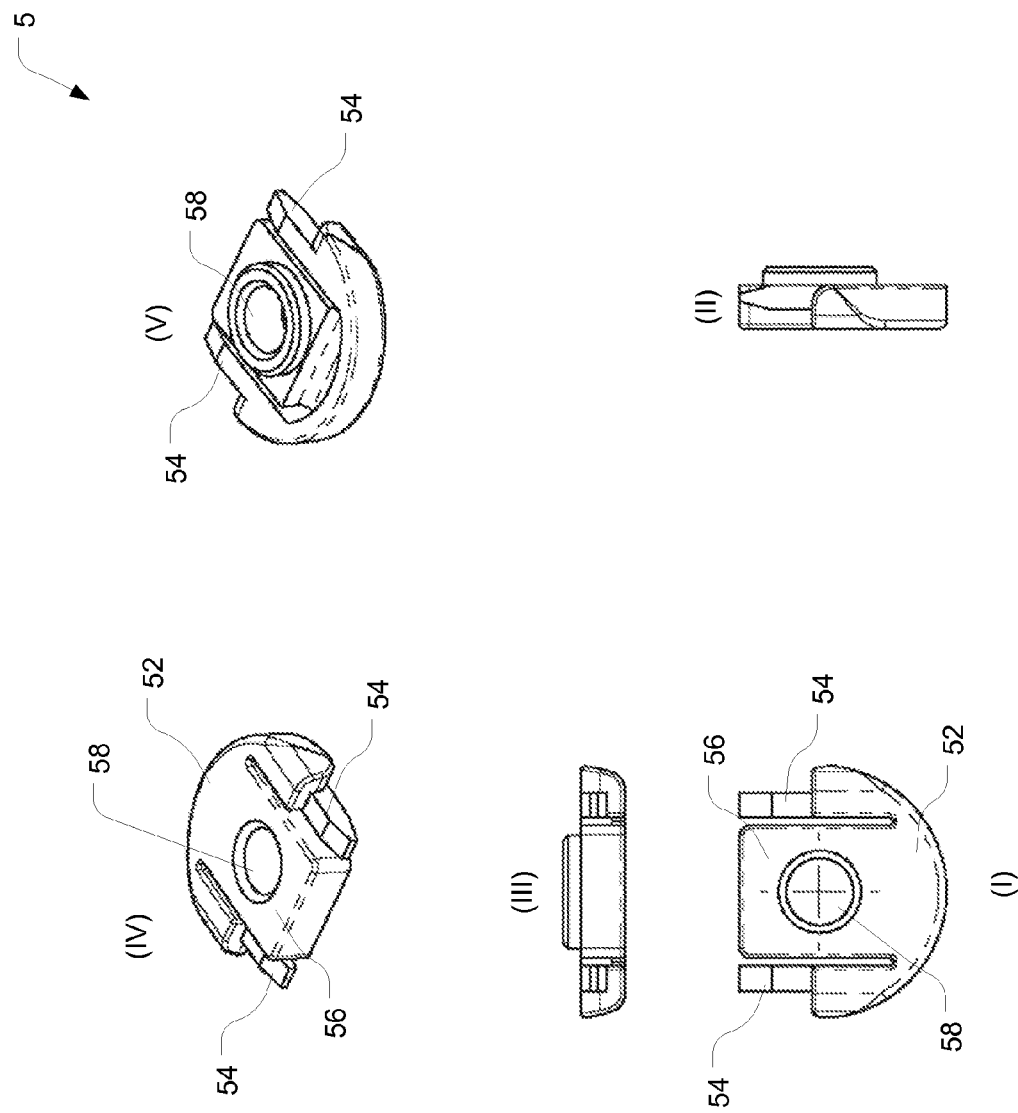
FIG. 47D are illustrations of different views of a threaded end cap in accordance with an embodiment of the present invention.

FIG. 47D are illustrations of different views of a threaded end cap in accordance with an embodiment of the present invention as follows: (I) is an illustration of the top side elevational view; (II) is an illustration of a left or right side elevational view; (III) is an illustration of a front side elevational view; (IV) is an illustration of a top side perspective view; and (V) is an illustration of a bottom side perspective view.

As illustrated in FIG. 47A, each mounting segment 2 comprises a mounting channel 22 on the front side 20 and backside 27. In a preferred embodiment, the mounting channel 22 may comprise a clamp access site 24. As illustrated in FIG. 47A(I), the front side 20 of mounting segment 2 includes a thumb screw retainer section 26 at the bottom end and a spacer locker retainer section 29 at the top end. As illustrated in FIG. 47A(III), the back side 27 of mounting segment 2 includes a threaded end cap retainer section 25 at the top end and a spacer locker retainer section 29 at the bottom end. The spacer locker retainer section 29 comprises a plurality of interlocking members 28, e.g. lugs or projections, which is one-half of an interlocking mechanism.

The threaded cap 5 comprises body 56, latch lugs 54, cap 52 and a threaded hole (or mounting nut) 58. Spacer locker 4 includes a hole 44 for pass-through of section 32 of thumb screw fastener 3, and a plurality of interlocking members 42, e.g. recesses or holes, which acts as a second half on the interlocking mechanism.

Figure 2:
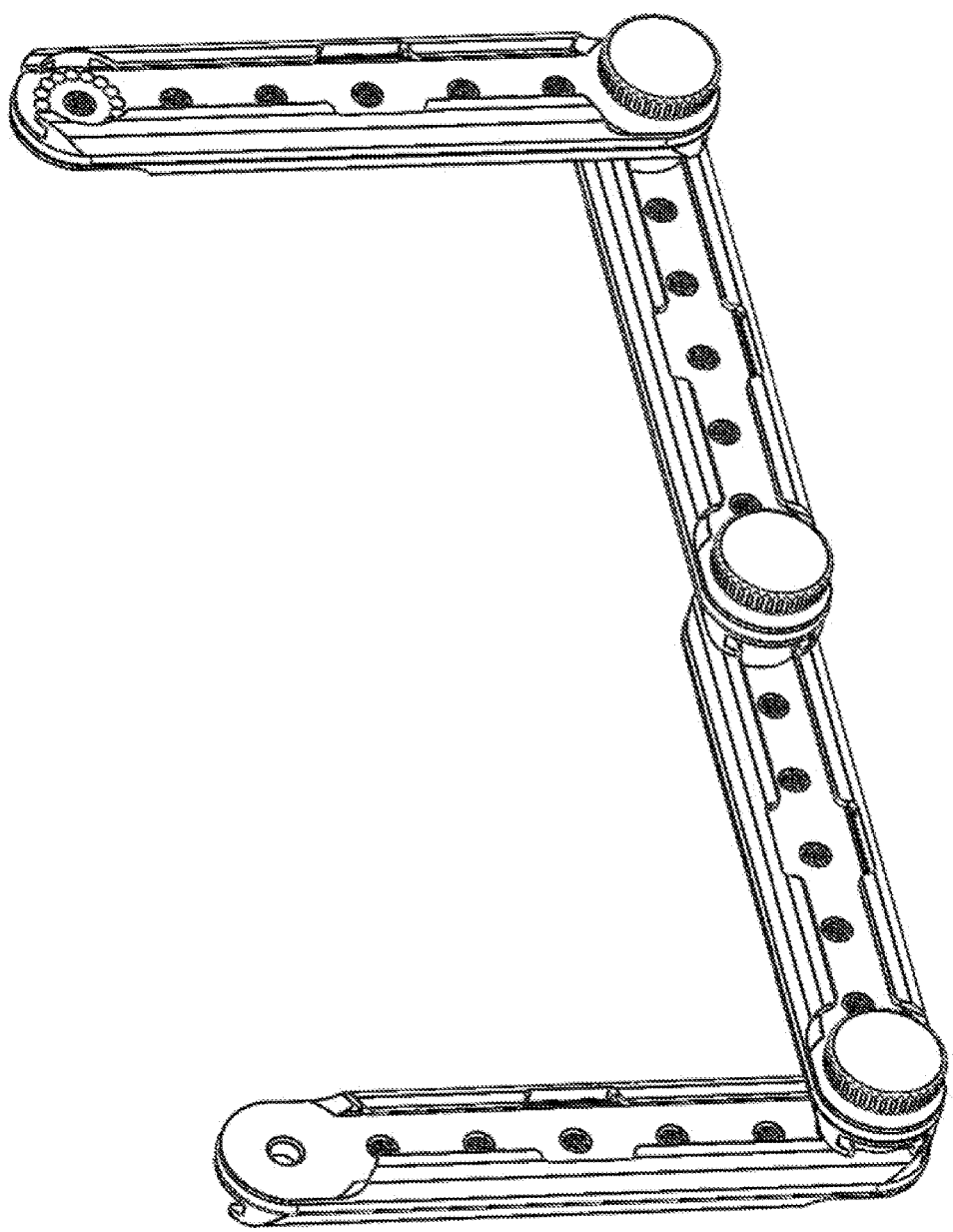
FIG. 2 shows a preferred embodiment of the device with four mounting segments connected linearly.

In more preferred embodiments, the mounting segments may be fastened together linearly, wherein one mounting segment on each end of the device is fastened to one other mounting segment and all other mounting segments are fastened to two other mounting segments. An embodiment of this configuration is shown in FIG. 2.

In preferred embodiments, the thumb screw 3 may comprise a threaded extension member 32 and cap 34. In more preferred embodiments, the spacer locker 4 may comprise a hole 42 that will accommodate the threaded extension member 32, and the threaded end cap 5 may comprise a threaded hole 58 that will accommodate the threaded extension member. In highly preferred embodiments, the spacer locker 4 may comprise a plurality of lock points 42. The lock points 42 comprise a first half of an interlocking assembly, e.g. recesses in a projection and recess type interlock. Thus, lock points 42 when engaged together with a complementary interlock 28, e.g. projections, on mounting segment 2 may allow for incremental and secured adjustment of a mounting segment with respect to an adjacent mounting segment. As illustrated in FIG. 1, two mounting segments may be configured in the desired relative alignment such that the bottom end of backside 27 of a first mounting segment 2(A) is coupled to the top end of front side 20 of a second mounting segment 2(B) with thumb screw fastener 3 threaded to and engaged to threaded end cap 5 through spacer locker 4 located between mounting segments 2(A) and 2(B). Threaded end cap 5 slides into and latches into slot 22 at threaded end cap retainer section 25. Any other suitable locking mechanism may be used to secure the threaded end cap 5 to the thumb screw fastener 3 and thereby lock the mounting segments together. The steps described above may be repeated to lock the desired number of mounting segments into the desired relative positions.

In some preferred embodiments, the mounting channel may comprise one or more threaded holes (14). In more preferred embodiments, the threaded holes may comprise ¼-20 or ⅜-16 threaded holes, as found on many tripods.

Figure 3:
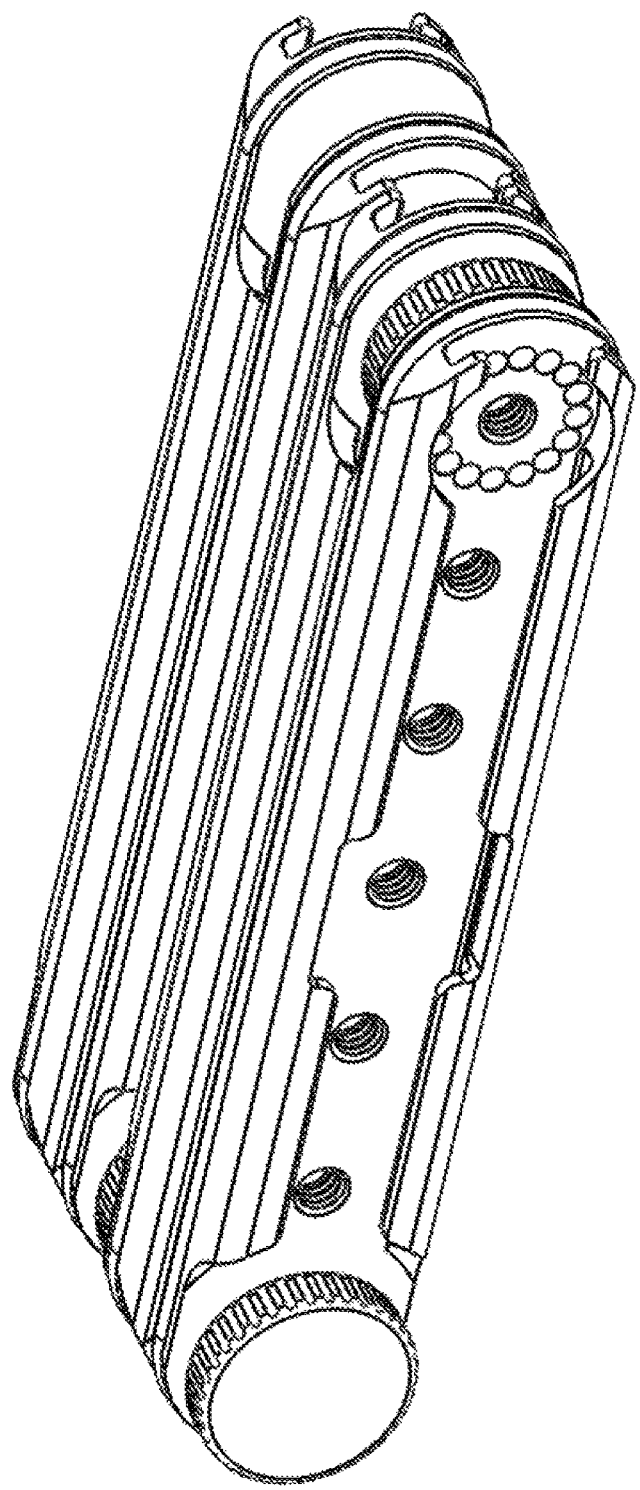
FIG. 3 shows a folded configuration of a preferred embodiment of the device with four mounting segments.
Figure 4:
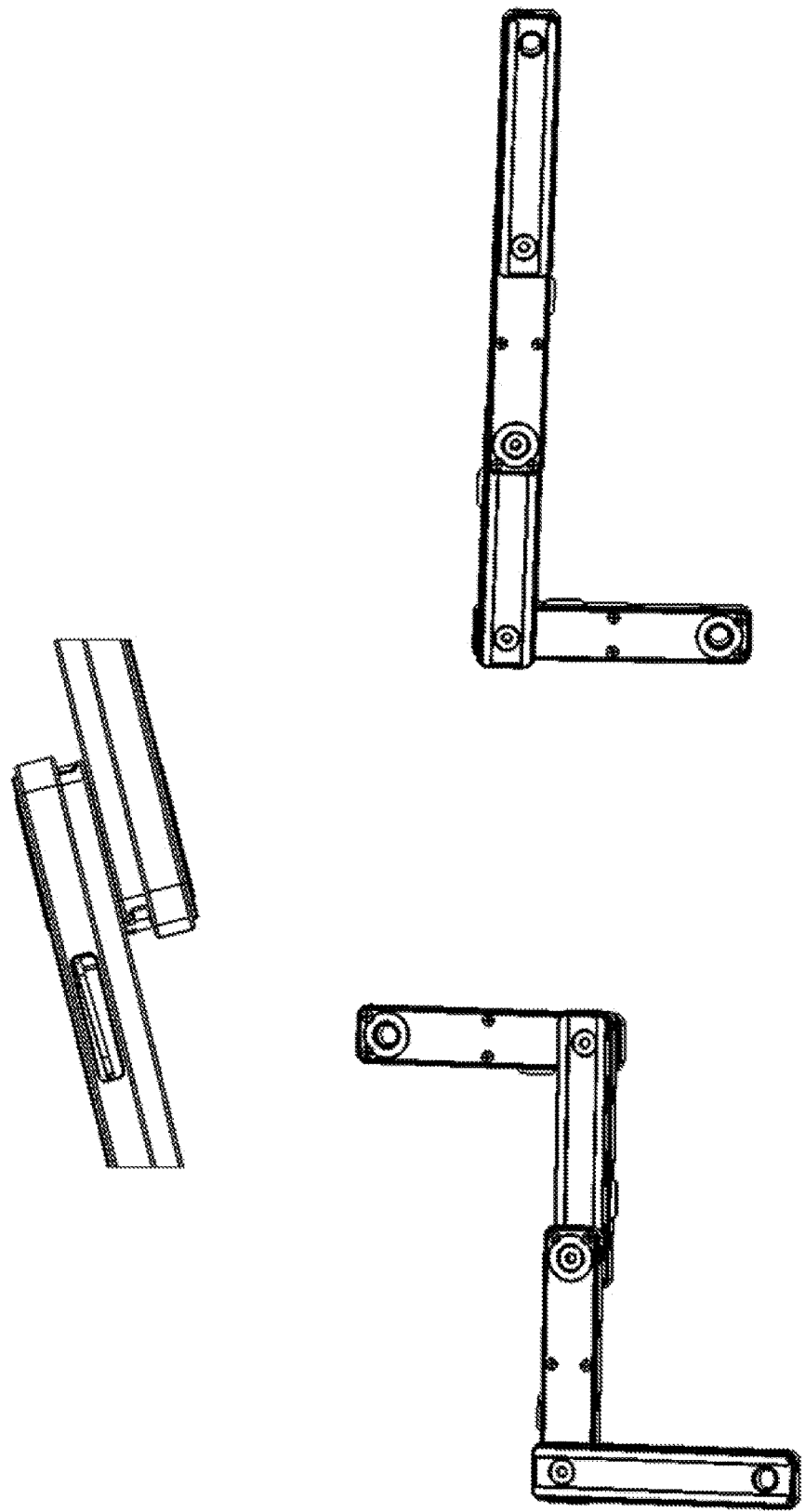
FIG. 4 shows a spring/release embodiment of the device.
Figure 6:
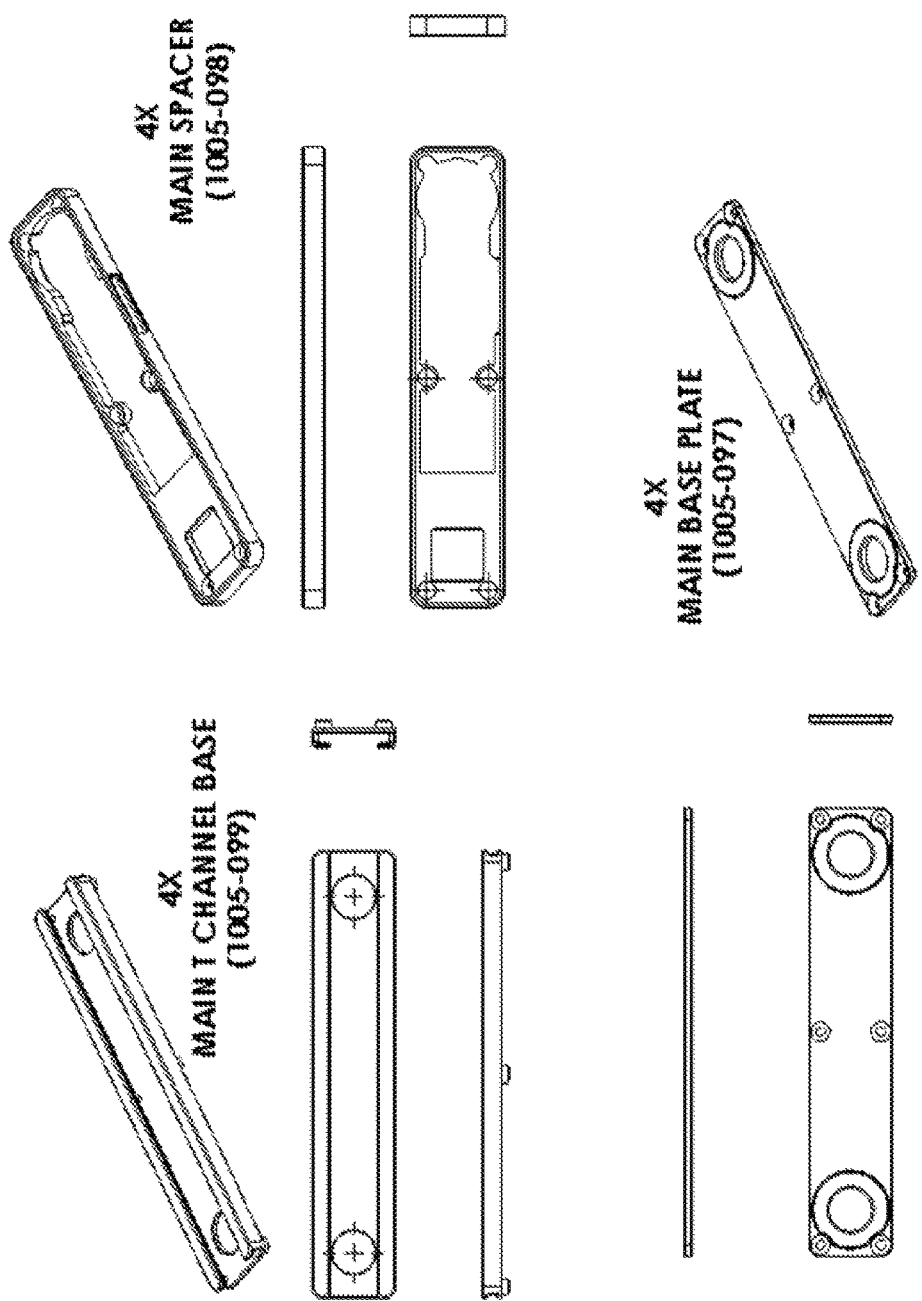
FIG. 6 shows the mounting base and mounting channel of a spring/release embodiment of the device.
Figure 7:
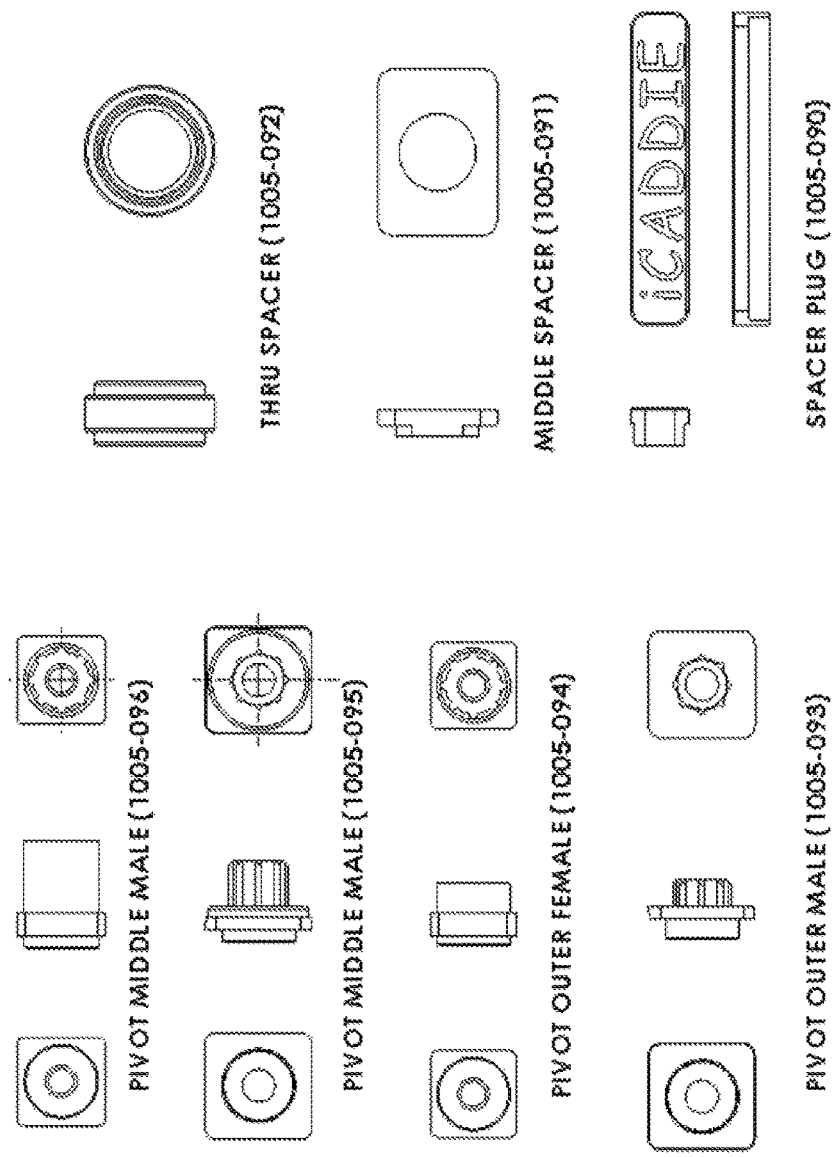
FIG. 7 shows the fastener, mounting nut, and mounting spacer of a spring/release embodiment of the device.
Figure 8:
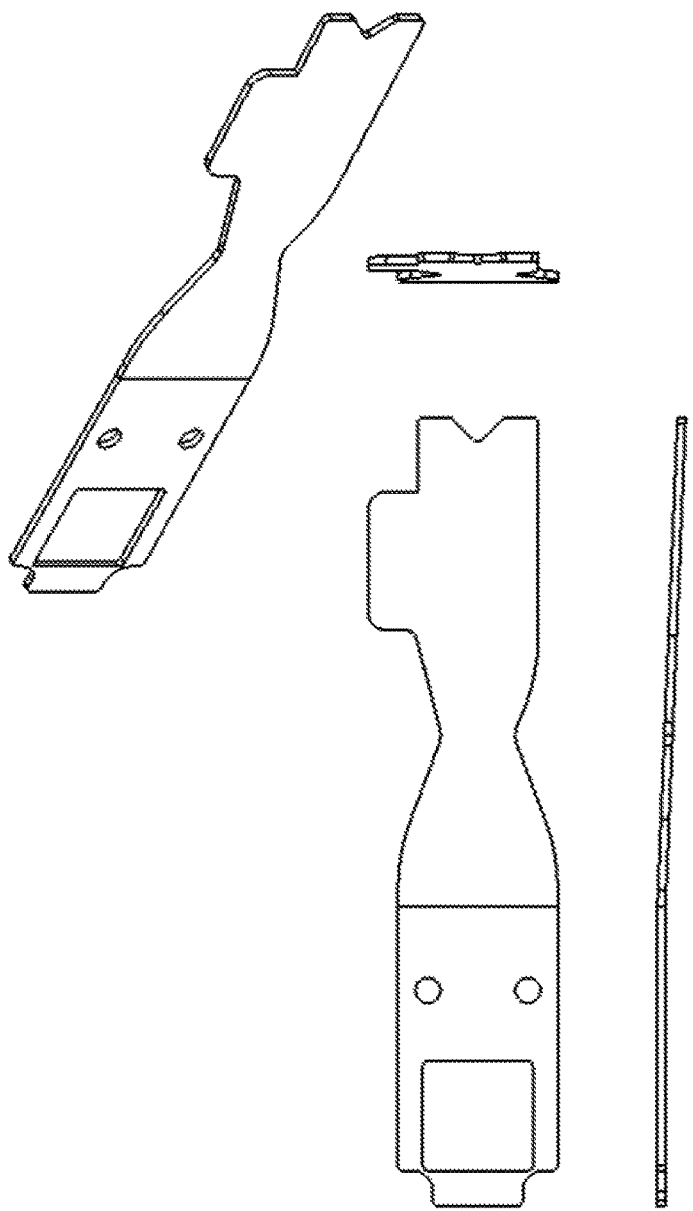
FIG. 8 shows the internal spring plate of a spring/release embodiment of the device.

The device may be configured to generate fully overlapping mounting segments, resembling a carpenter's ruler, as shown in FIG. 3. In this configuration, the device may be highly portable and may preferably fit readily into a pocket on the user's clothing.

In some non-preferred embodiments, the mounting segments may be connected using a spring and a pressure-activated release button to allow for movement of each mounting segment relative to the other mounting segment(s) to which it is connected, as shown in FIGS. 4-8. When pressure is applied to the release button the spring disengages, allowing the mounting segments to move freely with respect to one another. When pressure is subsequently removed from the release button the spring reengages and the mounting segments are then locked securely into their current positions.

In other non-preferred embodiments, the mounting segments may be connected via dual pivot points in a manner analogous to a foldable ladder.

In preferred embodiments, a camera or video accessory may be mounted to the device via the mounting channel 22. The mounting channel 22 may preferably have the same dimensions as a traditional camera flash shoe, as defined by the International Organization for Standardization in ISO 518:2006.[2] Any camera or video accessory designed to interface with a device using a traditional camera flash shoe may thereby be connected to the device via the mounting channel.

[2] http://www.iso.org/iso/catalogue_detail.htm?csnumber=36330

Figure 9:
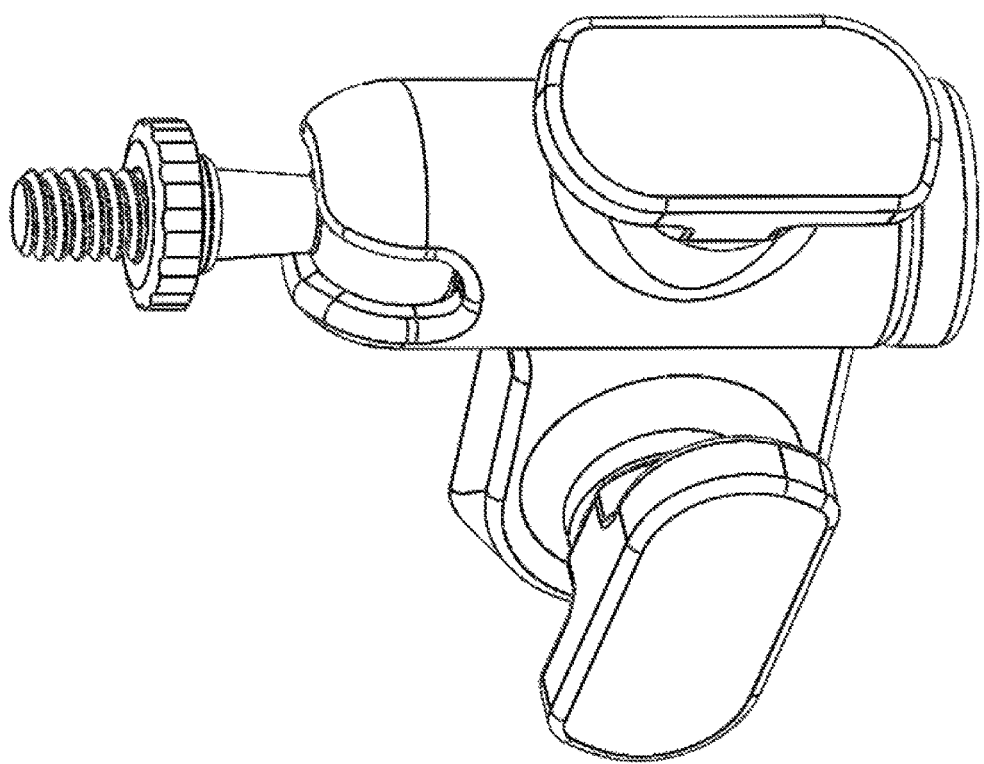
FIG. 9 shows the ball head section of an accessory attachment adapter.
Figure 10:
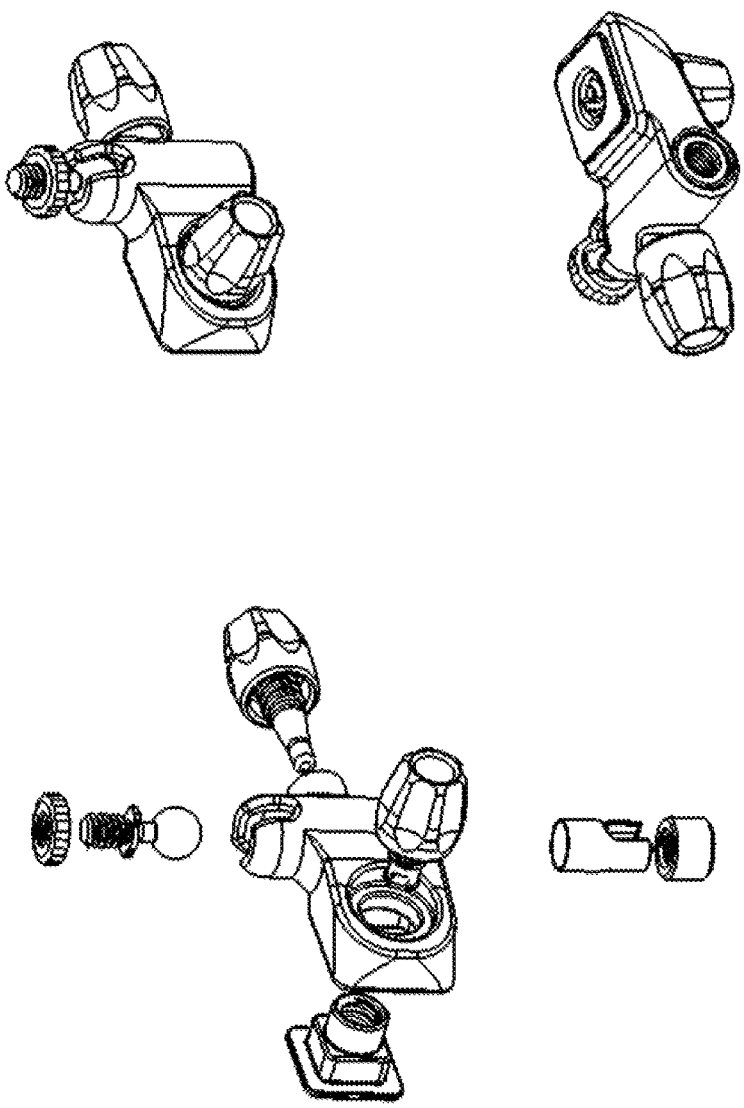
FIG. 10 shows an accessory attachment adapter.
Figure 11:
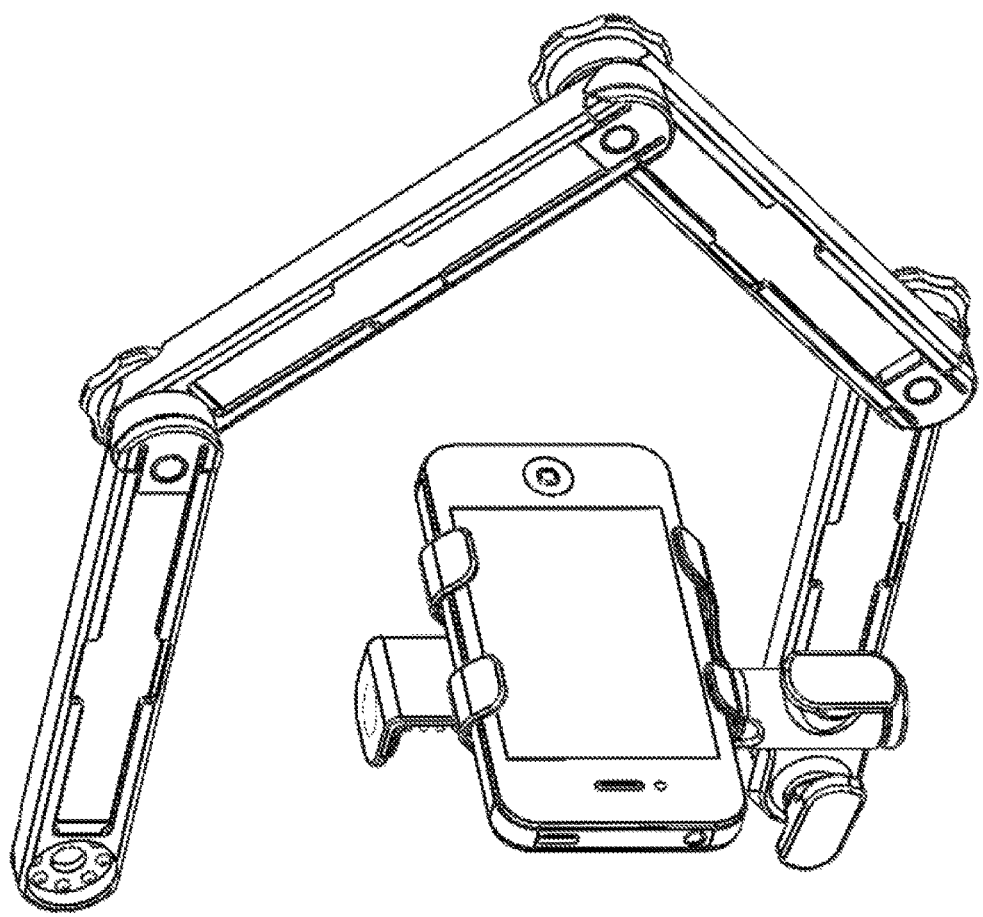
FIG. 11 shows a scorpion configuration of a preferred embodiment of the device securing a smart phone integrated digital camera.
Figure 12:
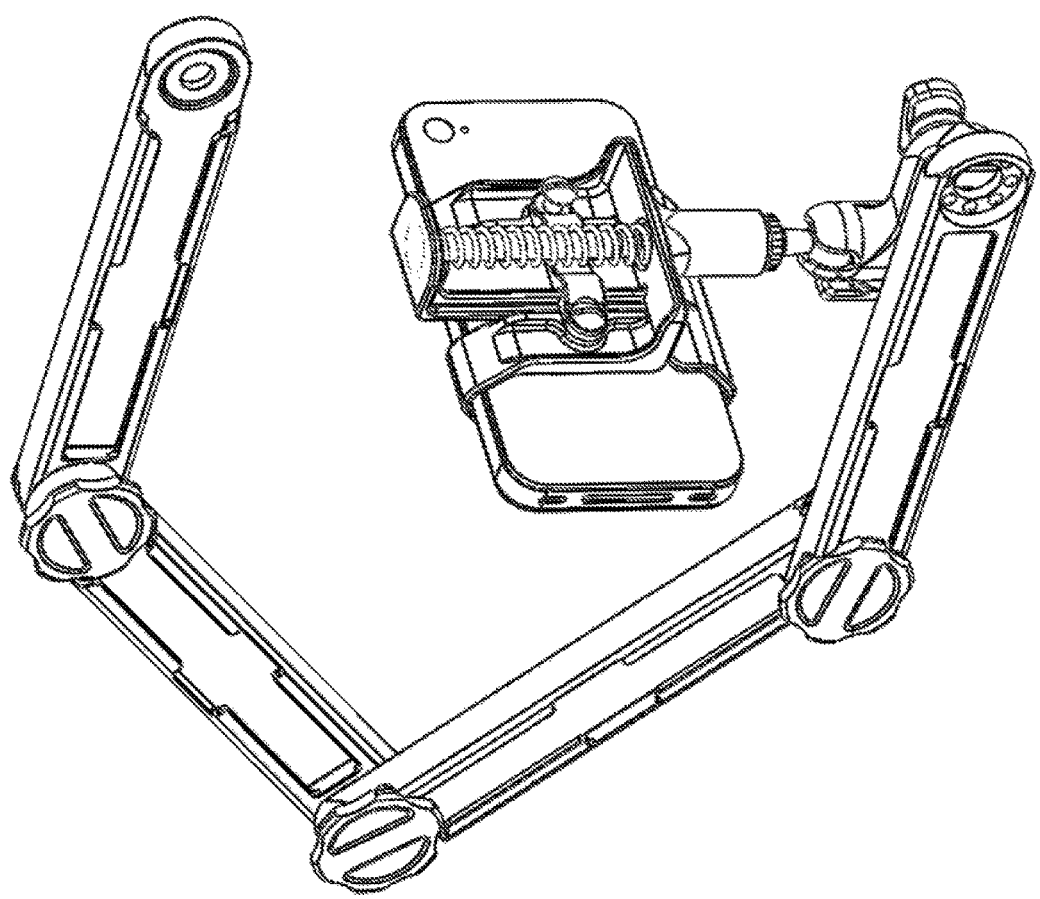
FIG. 12 shows a scorpion configuration of a preferred embodiment of the device securing a smart phone integrated digital camera.

In other preferred embodiments, a camera, camera accessory, videocamera, or video accessory may be mounted to the device using an adapter that is configured to attach to the device via the mounting channel 22 and is configured to attach to the camera, camera accessory, videocamera, or video accessory via a ¼-20 threaded tripod mount. The adapter may preferably comprise a ball head 15 to allow for adjustment of the position of the camera, camera accessory, videocamera, or video accessory, as shown in FIG. 9. A preferred embodiment of the adapter is shown in FIG. 10.

In preferred embodiments, the device may allow a user to hold, maneuver, and stabilize a camera, videocamera, camera accessory, or videocamera accessory in a variety of different ways. A camera may be a stand-alone camera such as a compact digital camera or a DSLR camera or an integrated digital camera such as a digital camera that is an element of a portable electronic device such as a cellular phone, smart phone, or tablet. A videocamera may be a stand-alone videocamera or an integrated videocamera such as a videocamera that is an element of a portable electronic device such as a cellular phone, smart phone, or tablet.

An integrated camera or integrated videocamera that is an element of a portable electronic device such as a cellular phone, smart phone, or tablet may be attached to the device using a spring clamp and ball joint mount. The spring clamp may be attached to the mounting channel via the clamp access site with the ball joint mount and configured to secure the portable electronic device. The spring clamp will secure the portable electronic device by applying sufficient pressure to the outside edges of the portable electronic device via compression of the spring to cradle and secure the portable electronic device. Preferred embodiments illustrating use of the spring clamp and ball joint mount are shown in FIGS. 11-14.

Figure 15:
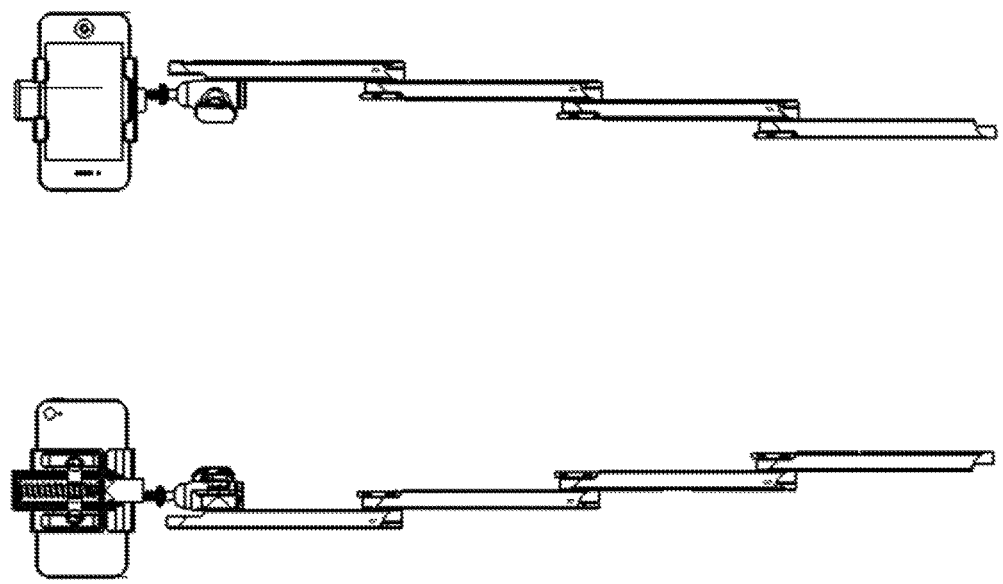
FIG. 15 shows a pole configuration of a preferred embodiment of the device securing a smart phone integrated digital camera.
Figure 16:
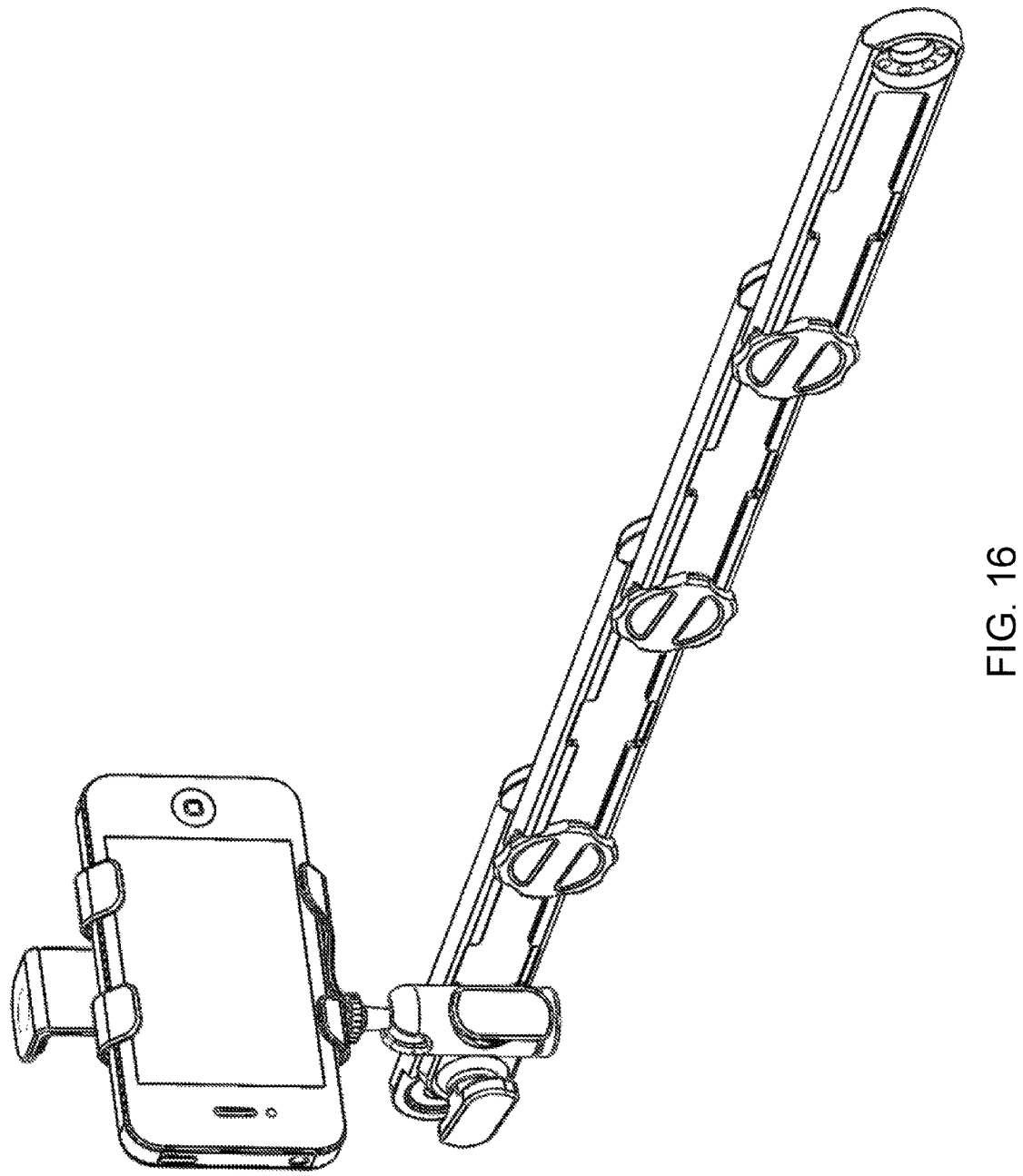
FIG. 16 shows a pole configuration of a preferred embodiment of the device securing a smart phone integrated digital camera.
Figure 18:
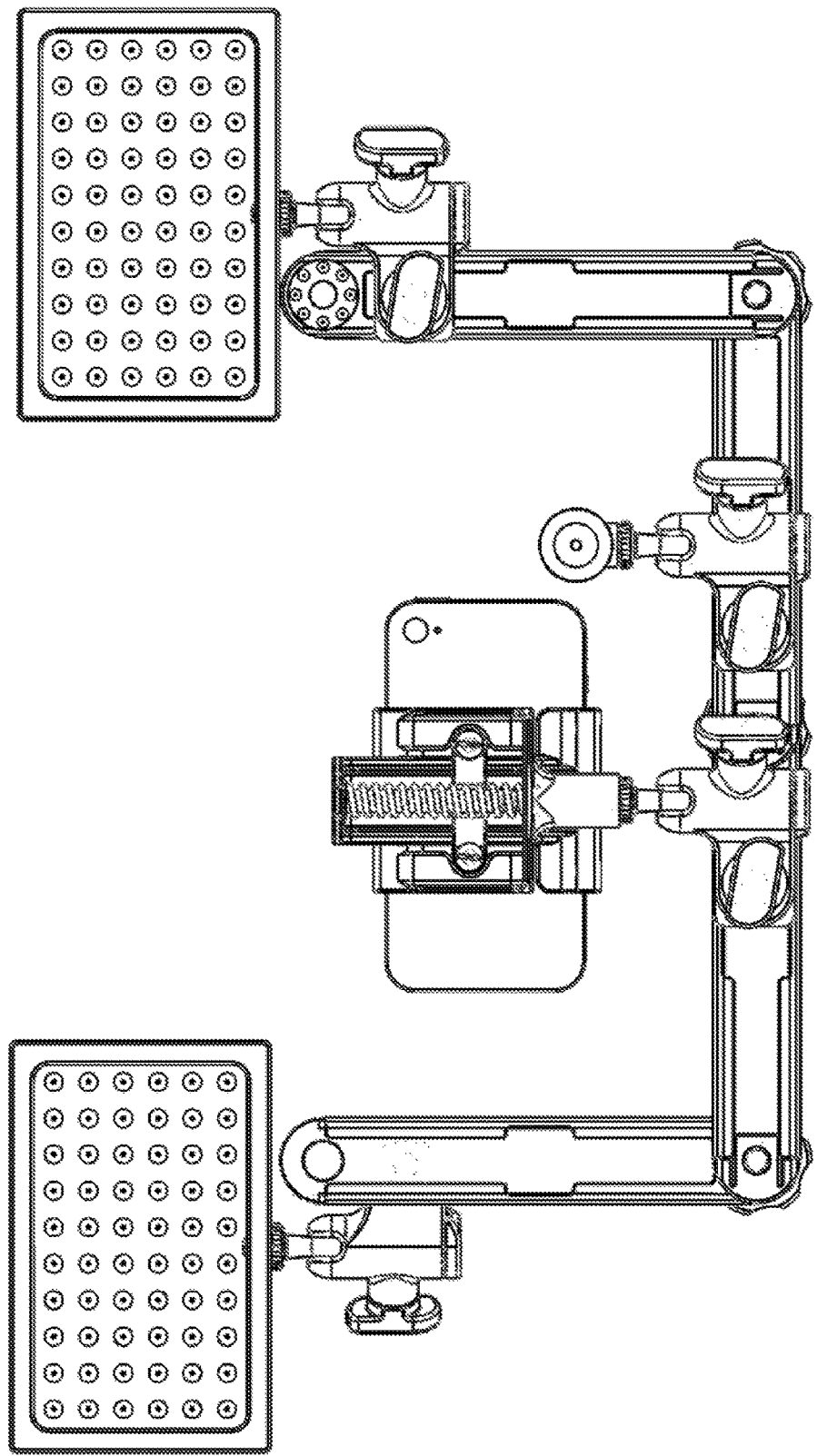
FIG. 18 shows a C configuration of a preferred embodiment of the device securing a smart phone integrated digital camera and accessories.
Figure 19:
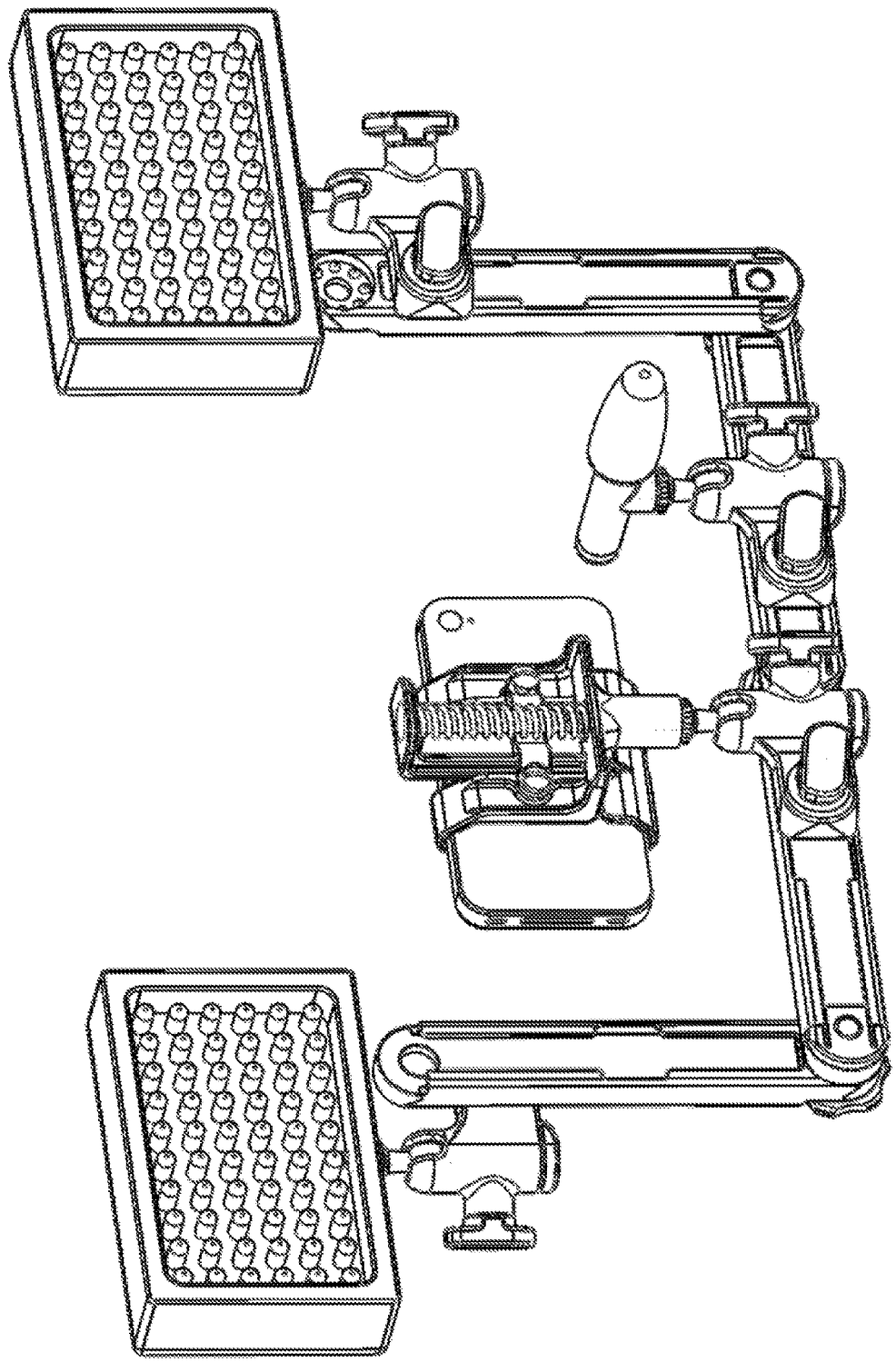
FIG. 19 shows a C configuration of a preferred embodiment of the device securing a smart phone integrated digital camera and accessories.
Figure 20:
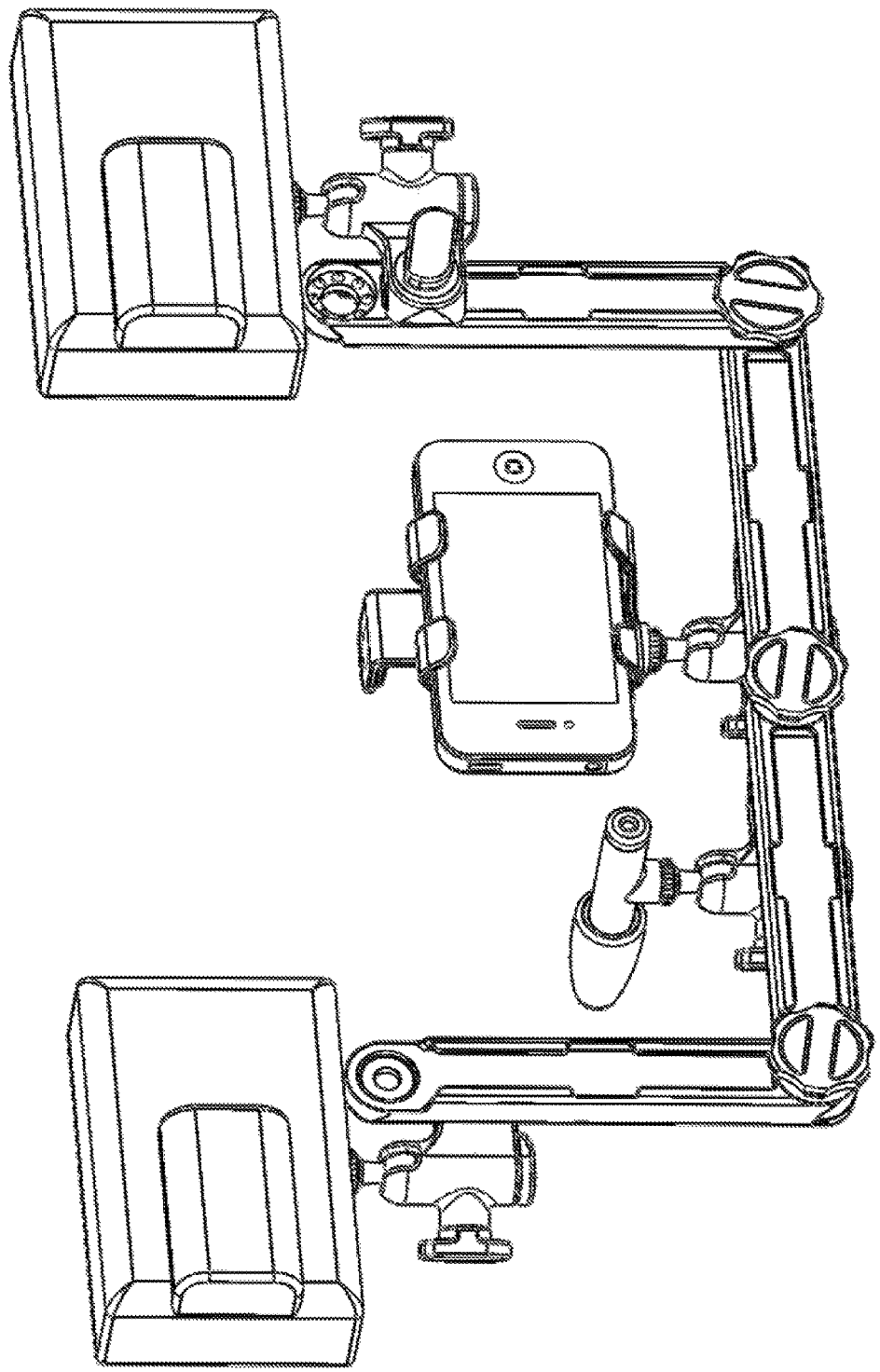
FIG. 20 shows a C configuration of a preferred embodiment of the device securing a smart phone integrated digital camera and accessories.
Figure 21:
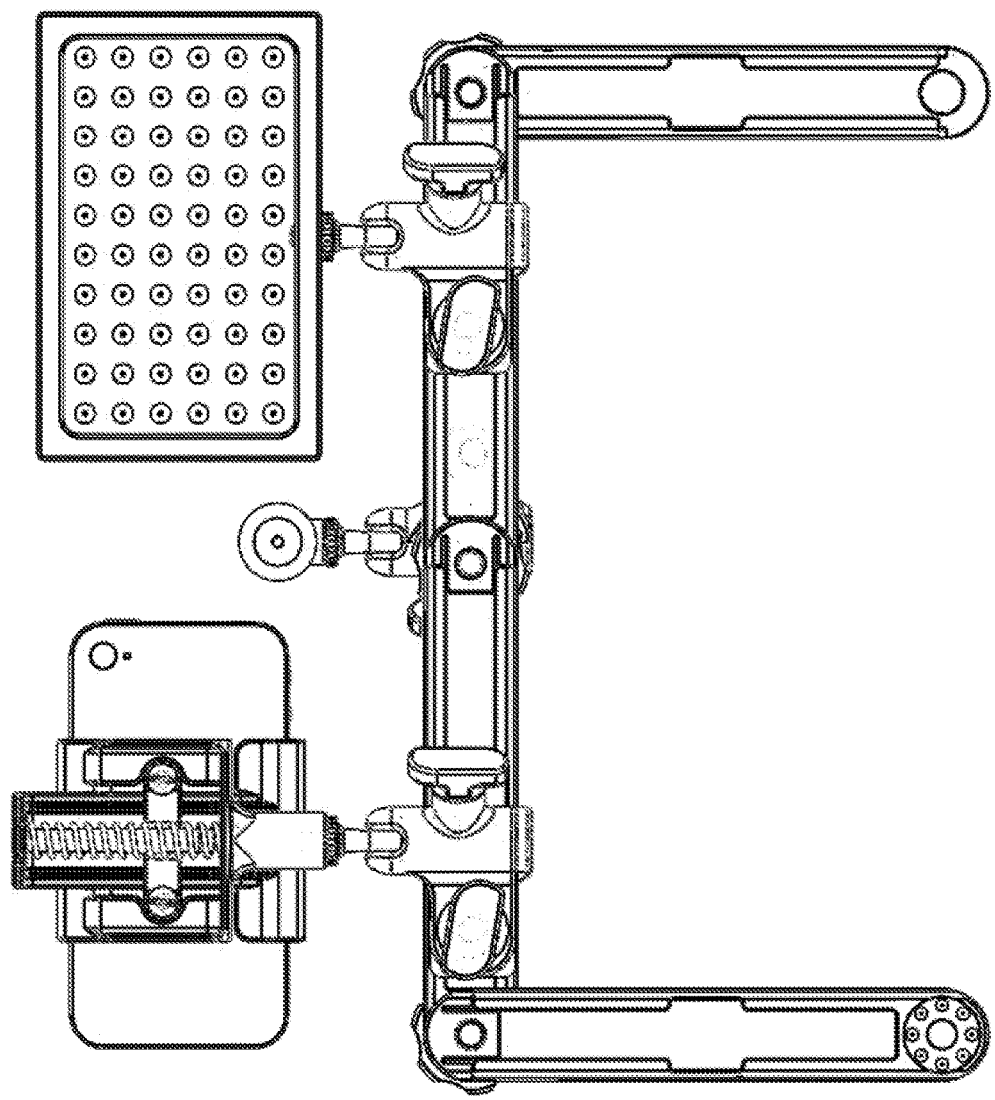
FIG. 21 shows a C configuration of a preferred embodiment of the device securing a smart phone integrated digital camera and an accessory.
Figure 22:
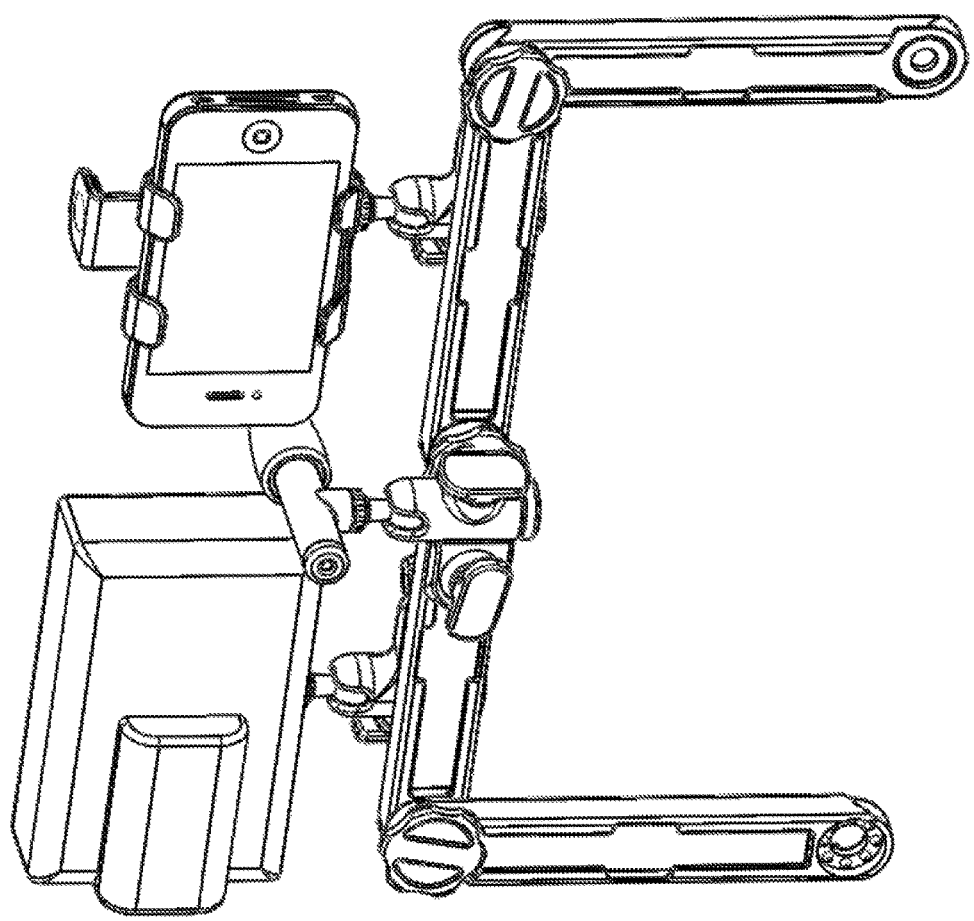
FIG. 22 shows a C configuration of a preferred embodiment of the device securing a smart phone integrated digital camera and an accessory.
Figure 23:
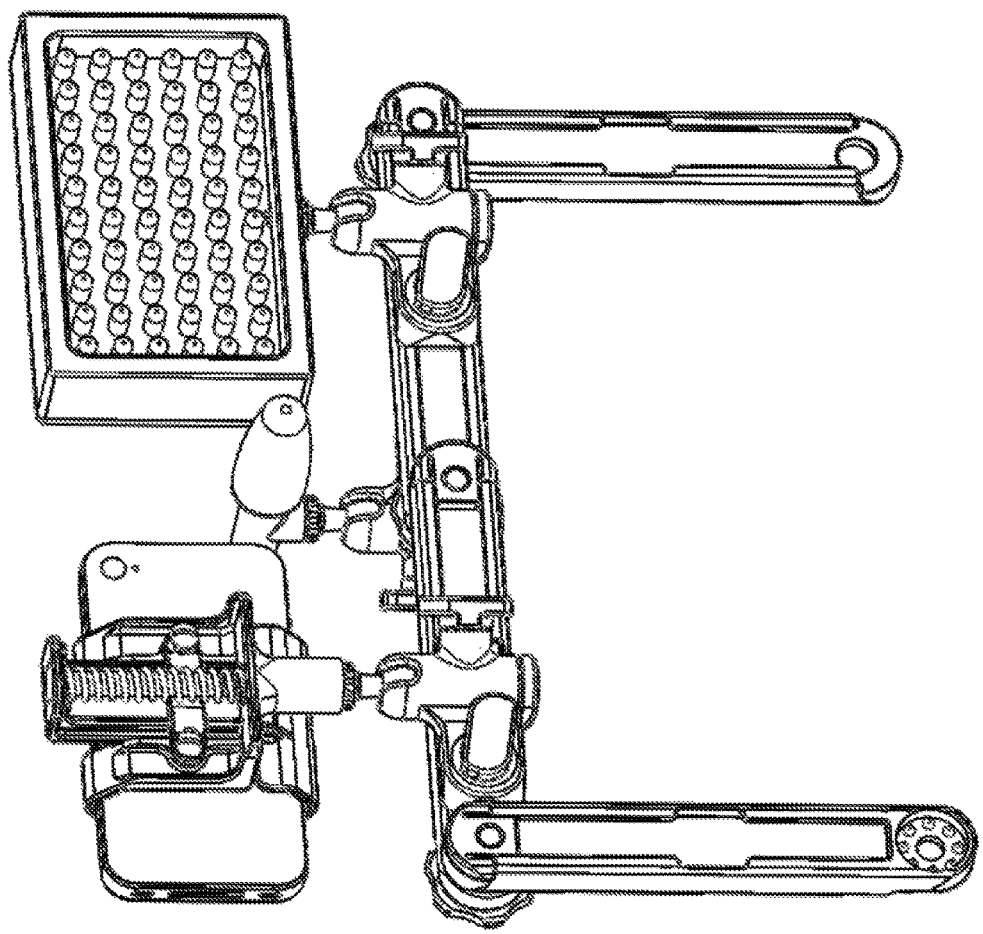
FIG. 23 shows a C configuration of a preferred embodiment of the device securing a smart phone integrated digital camera and an accessory.
Figure 24:
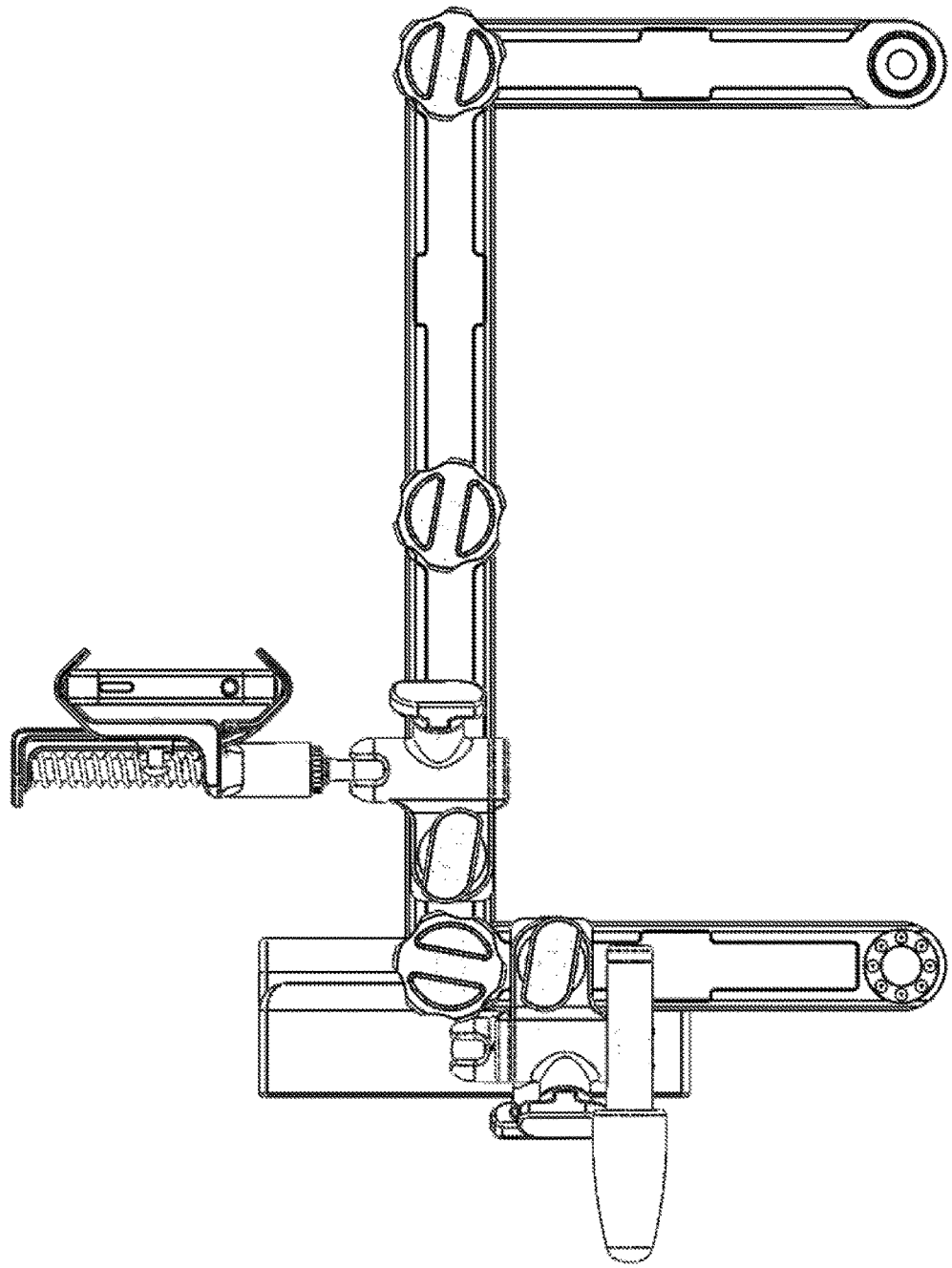
FIG. 24 shows a shoulder mounting configuration of a preferred embodiment of the device securing a smart phone integrated digital camera and an accessory.
Figure 25:
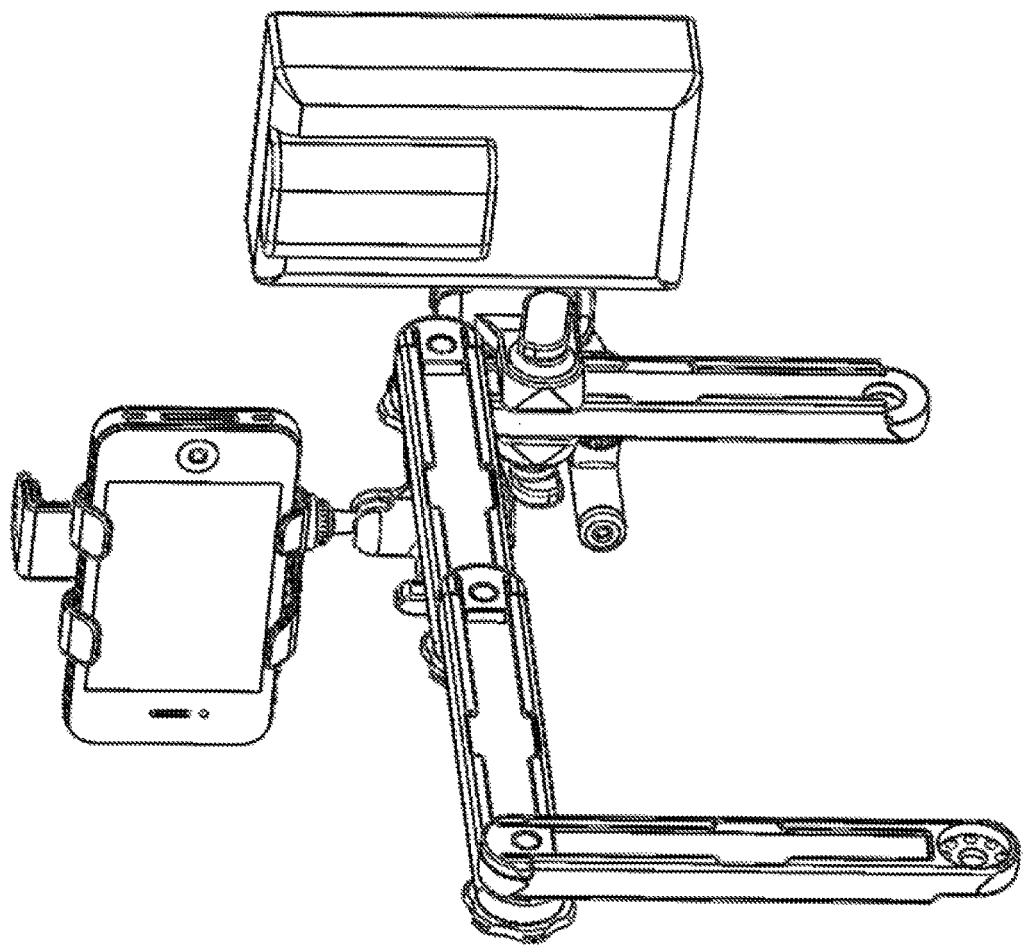
FIG. 25 shows a shoulder mounting configuration of a preferred embodiment of the device securing a smart phone integrated digital camera and an accessory.
Figure 26:
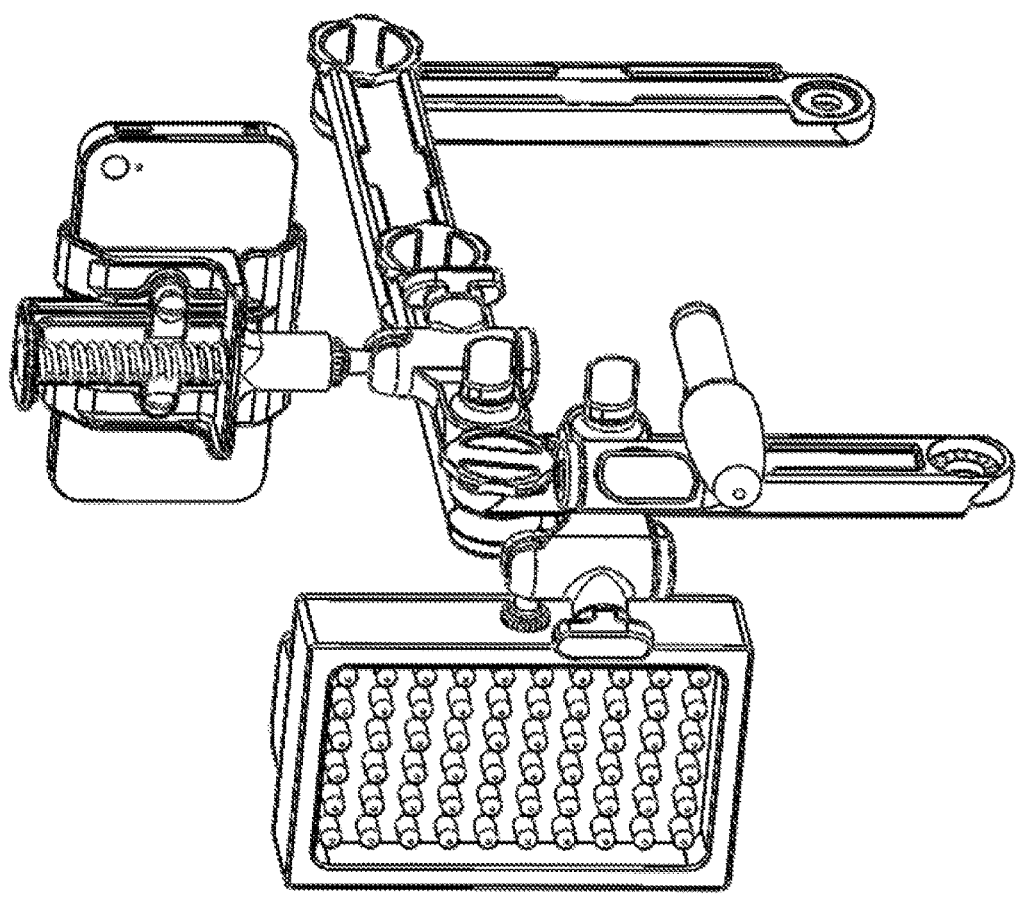
FIG. 26 shows a shoulder mounting configuration of a preferred embodiment of the device securing a smart phone integrated digital camera and an accessory.
Figure 27:
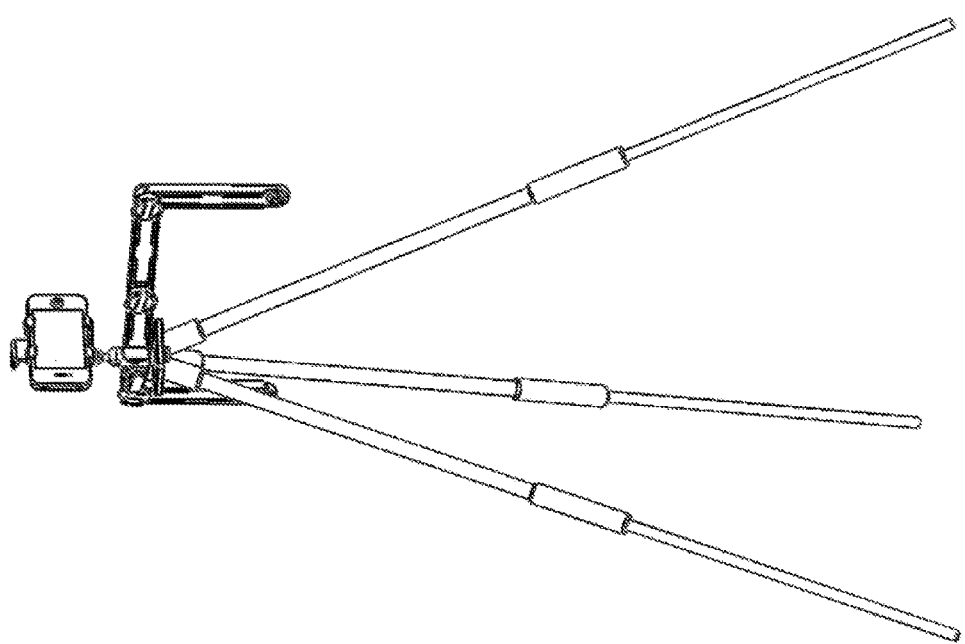
FIG. 27 shows a tripod mounting configuration of a preferred embodiment of the device securing a smart phone integrated digital camera.
Figure 28:
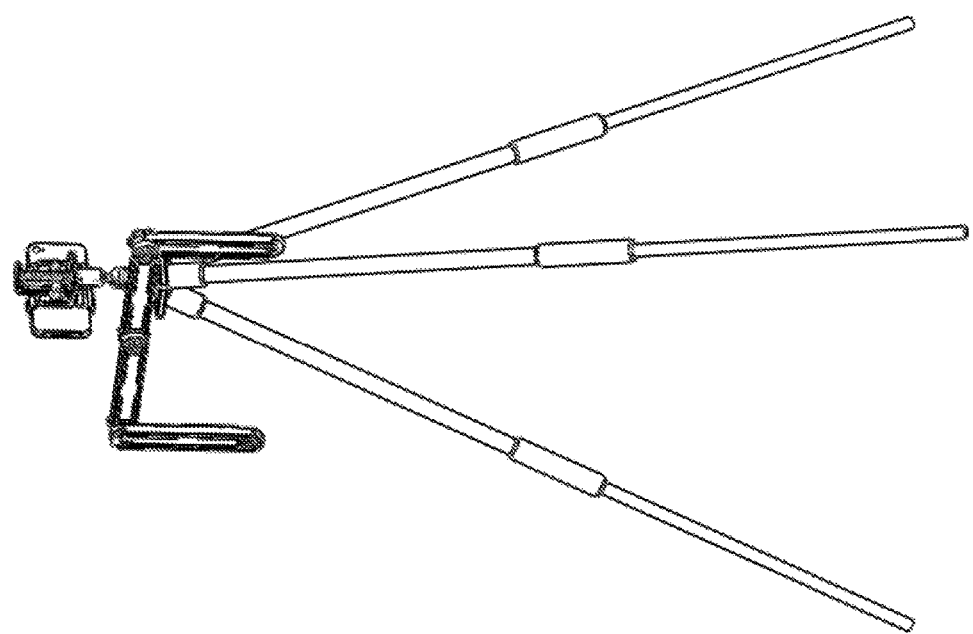
FIG. 28 shows a tripod mounting configuration of a preferred embodiment of the device securing a smart phone integrated digital camera.
Figure 32:
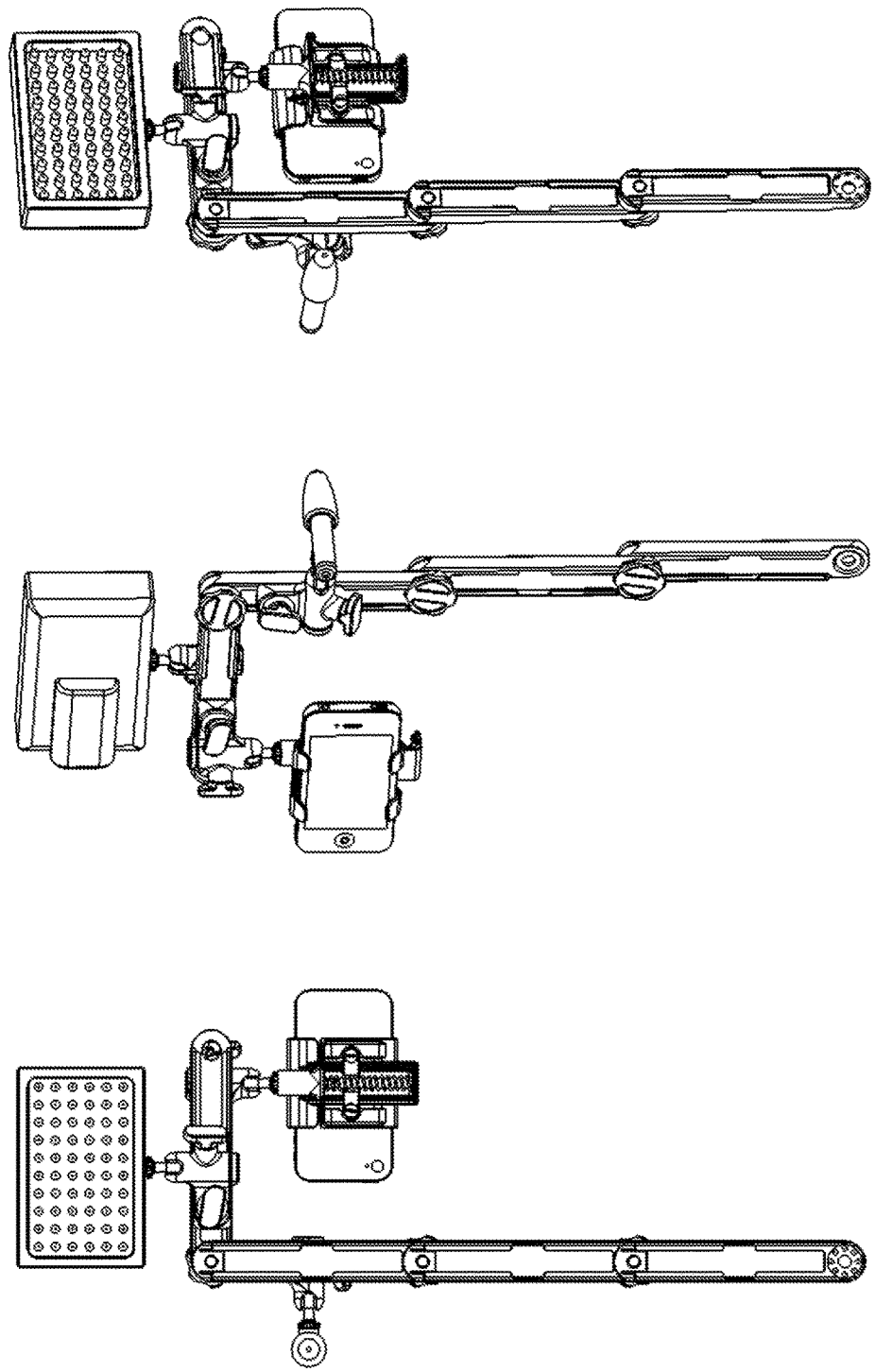
FIG. 32 shows an L configuration of a preferred embodiment of the device securing a smart phone integrated digital camera and an accessory.
Figure 33:
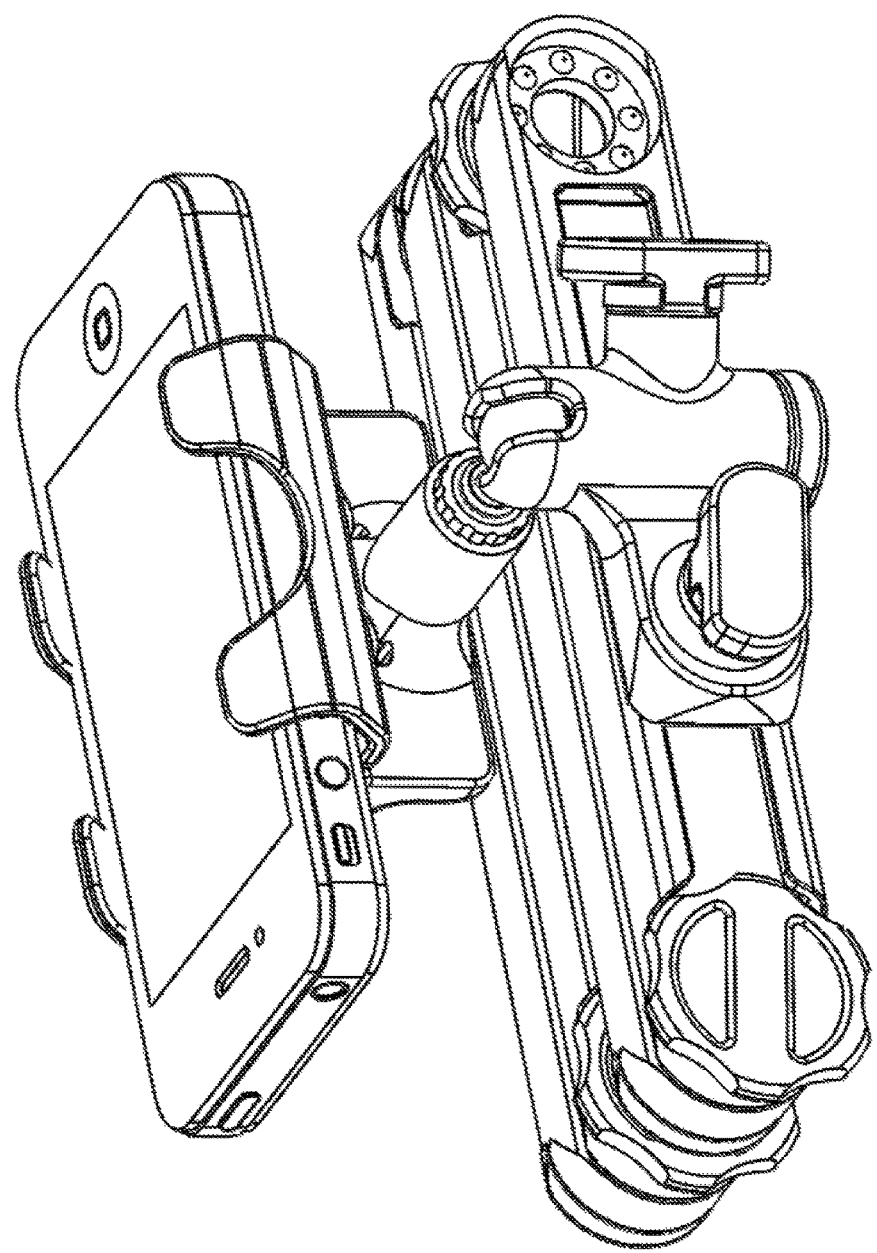
FIG. 33 shows a closed quick draw configuration of the device securing a smart phone integrated digital camera.
Figure 34:
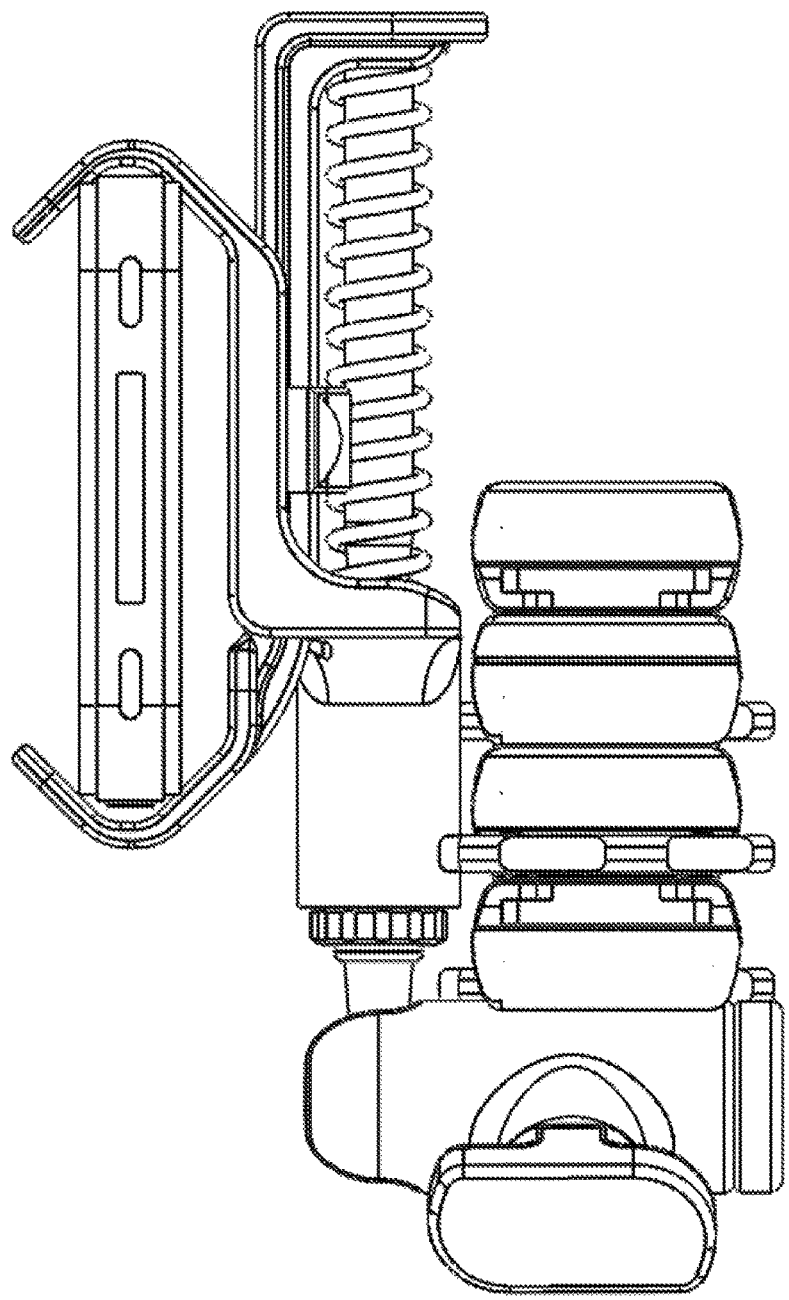
FIG. 34 shows a closed quick draw configuration of the device securing a smart phone integrated digital camera.
Figure 35:
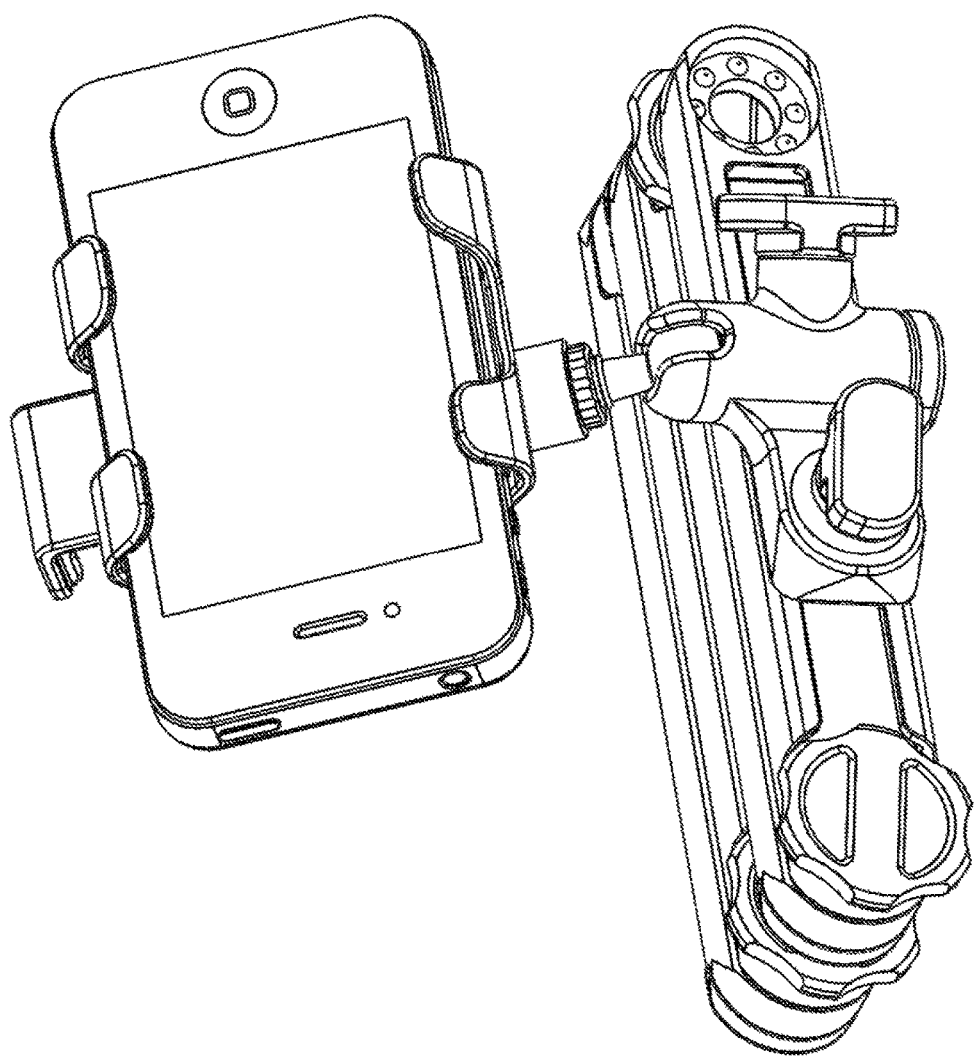
FIG. 35 shows a closed quick draw configuration of the device securing a smart phone integrated digital camera.
Figure 36:
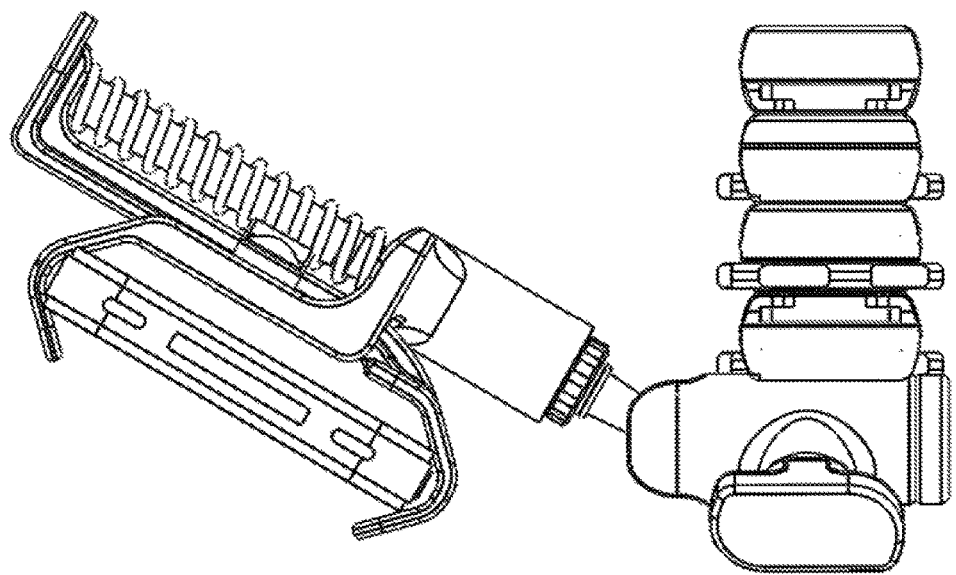
FIG. 36 shows a closed quick draw configuration of the device securing a smart phone integrated digital camera.
Figure 37:
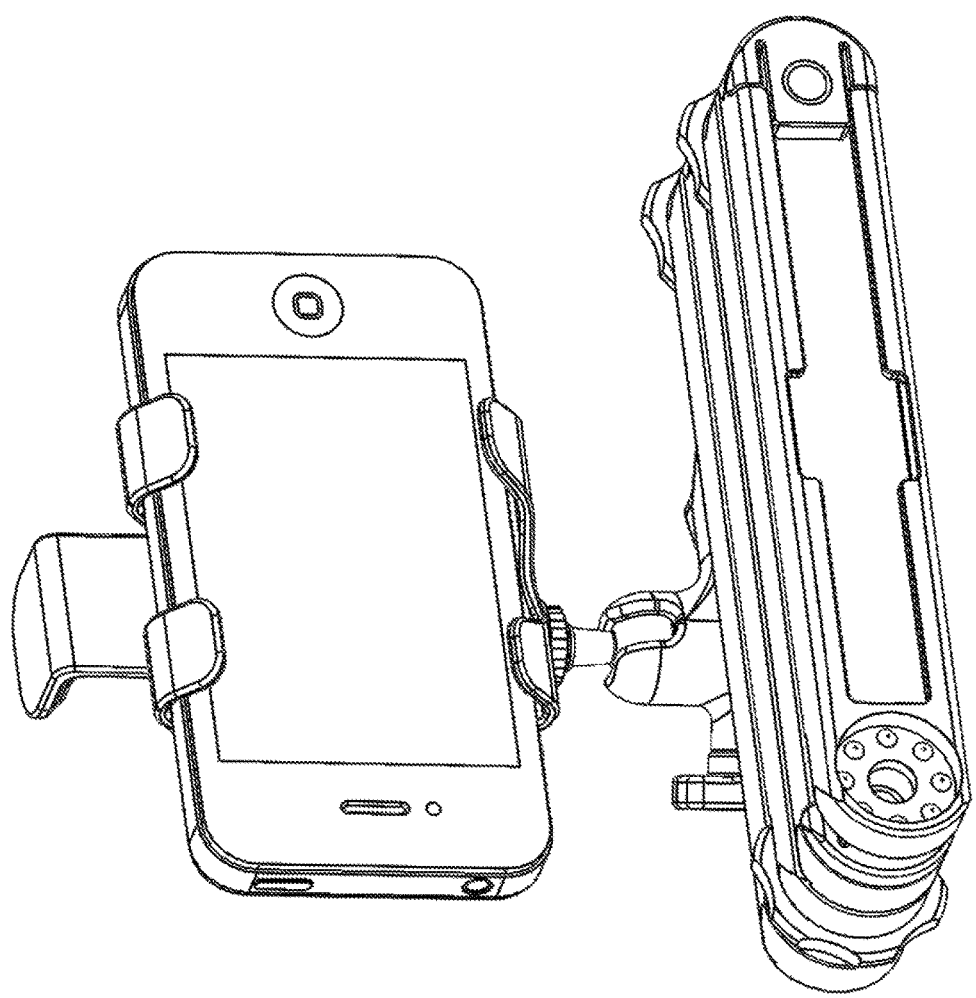
FIG. 37 shows a closed quick draw configuration of the device securing a smart phone integrated digital camera.
Figure 38:
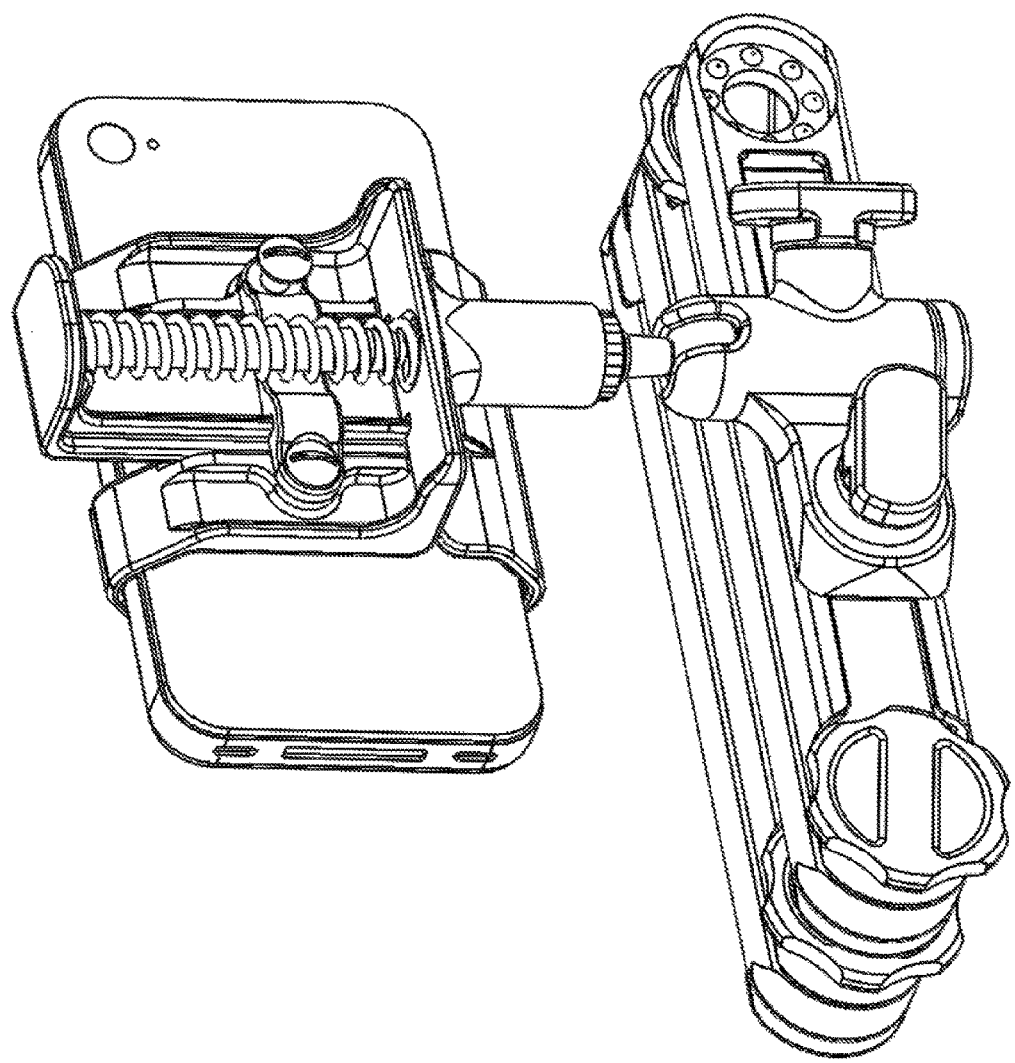
FIG. 38 shows a closed quick draw configuration of the device securing a smart phone integrated digital camera.
Figure 39:
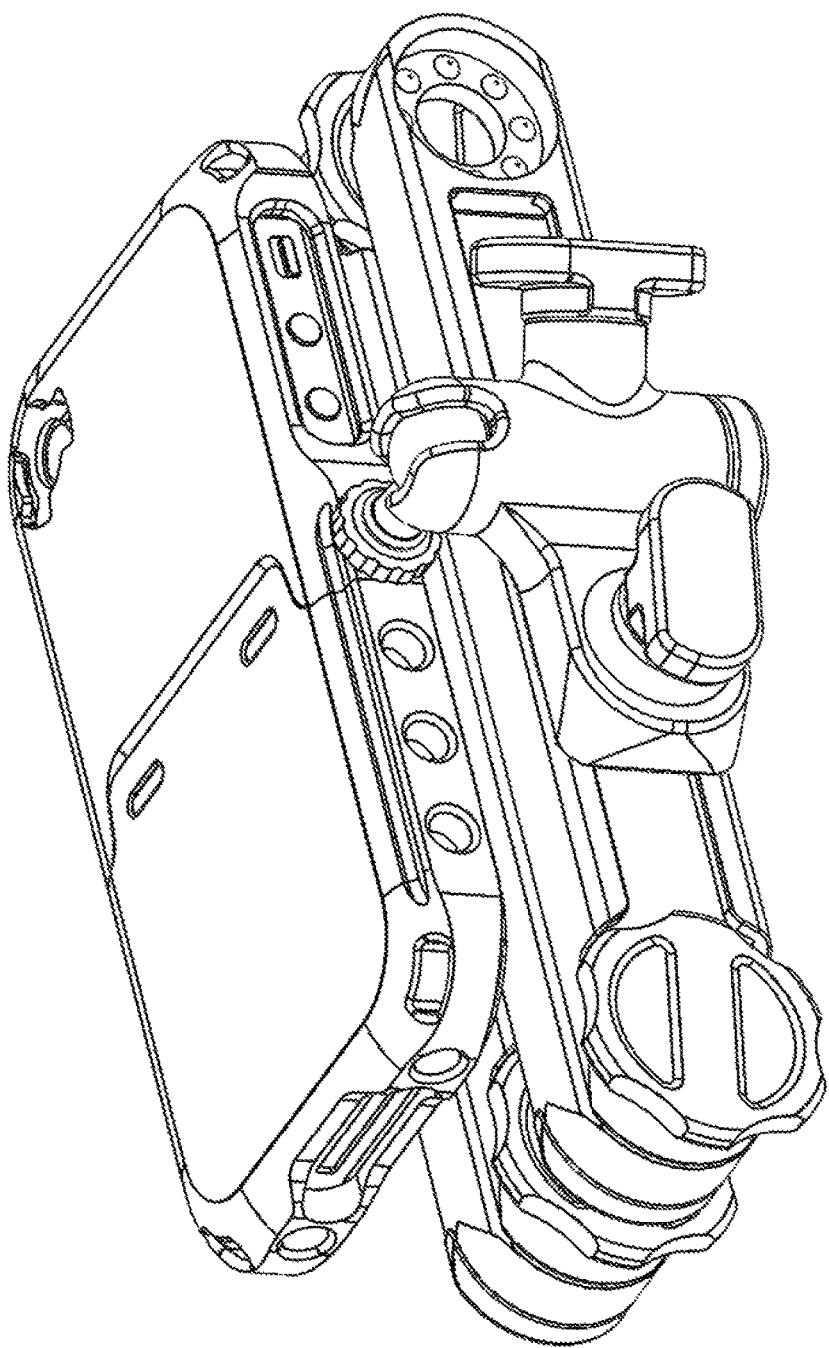
FIG. 39 shows a closed quick draw configuration of the device securing a smart phone integrated digital camera.
Figure 40:
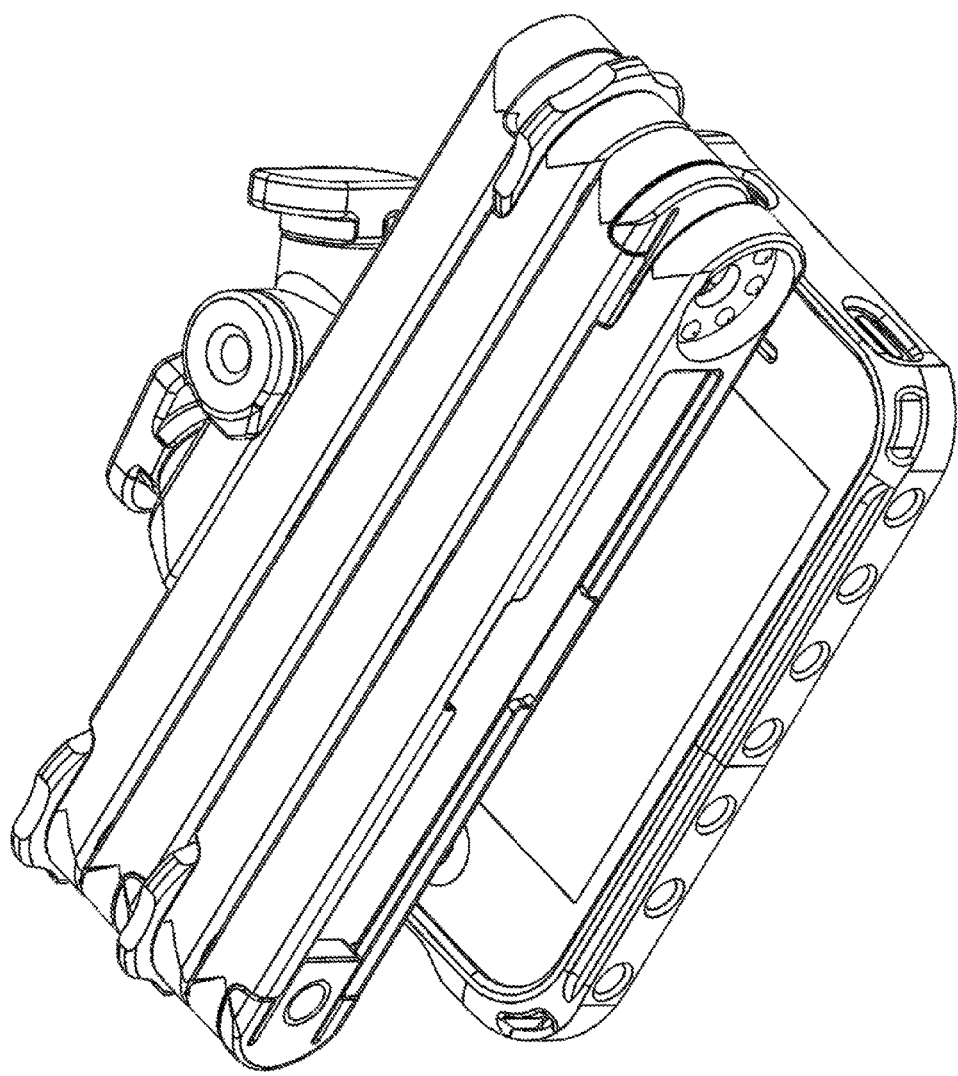
FIG. 40 shows a closed quick draw configuration of the device securing a smart phone integrated digital camera.
Figure 41:
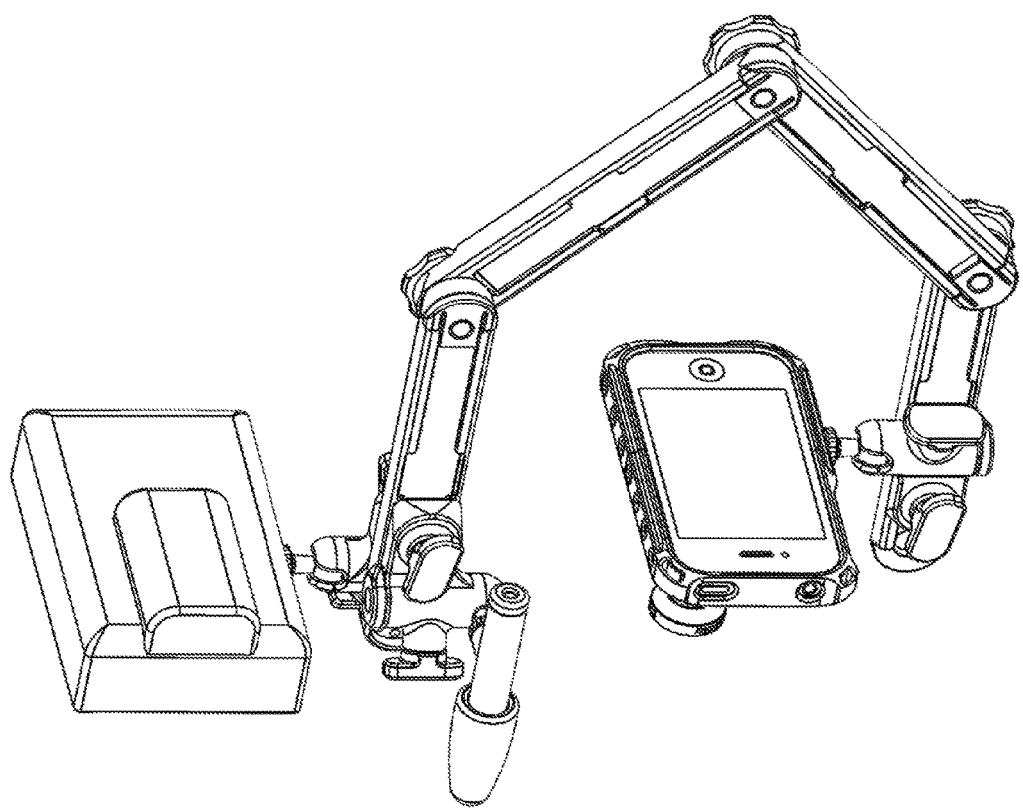
FIG. 41 shows a scorpion configuration of a preferred embodiment of the device securing a smart phone integrated digital camera and an accessory.
Figure 44:
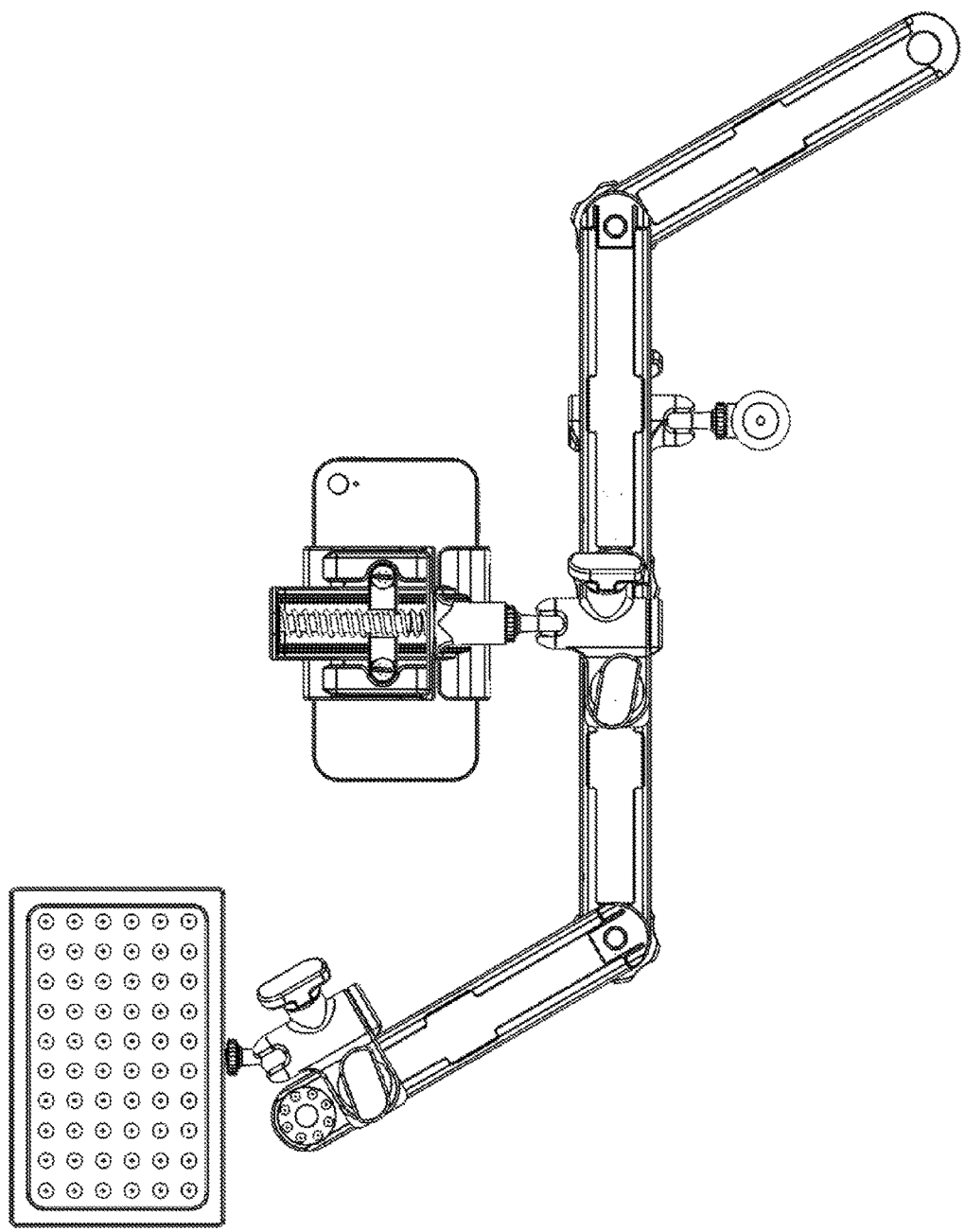
FIG. 44 shows a Z configuration of a preferred embodiment of the device securing a smart phone integrated digital camera and an accessory.
Figure 45:
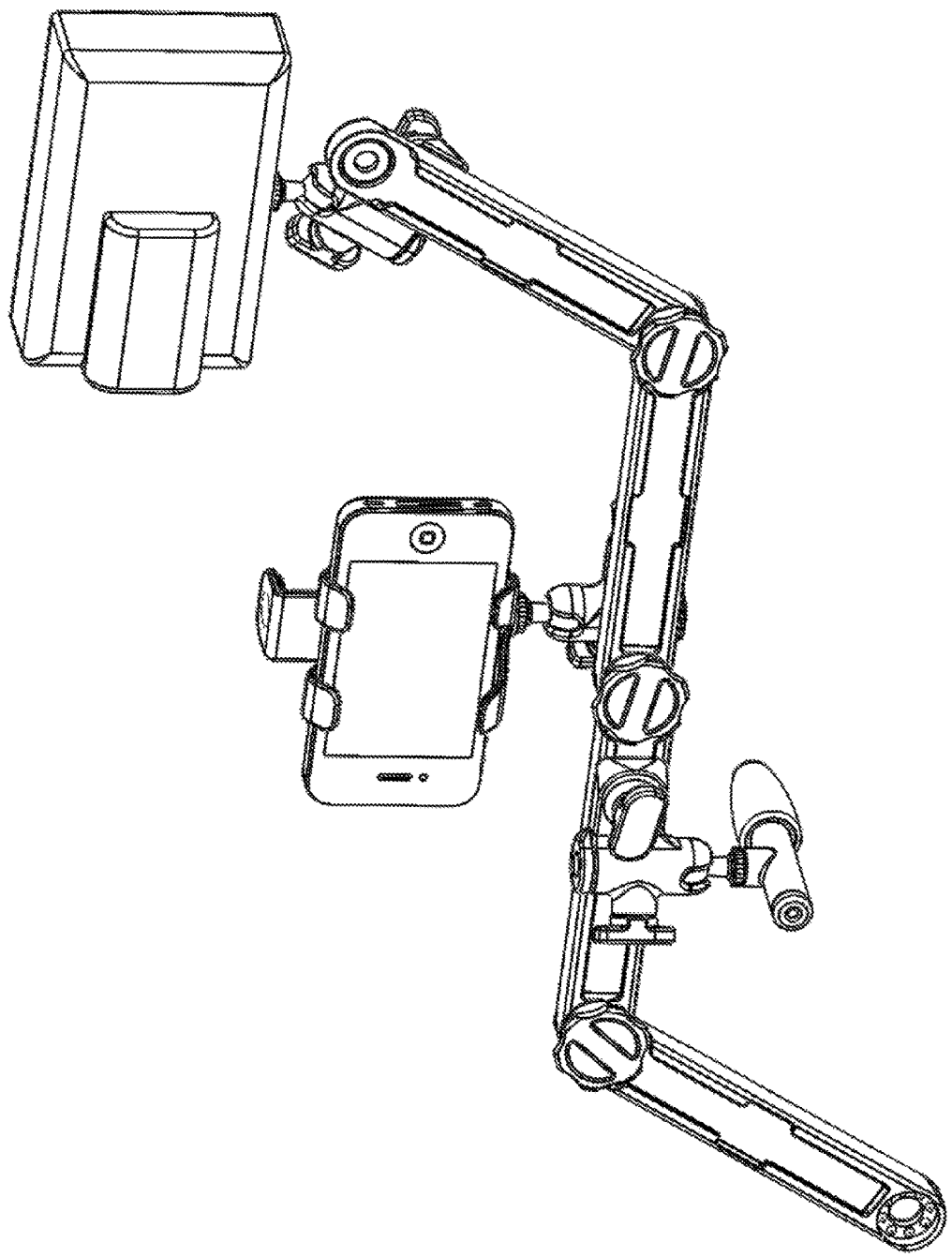
FIG. 45 shows a Z configuration of a preferred embodiment of the device securing a smart phone integrated digital camera and an accessory.
Figure 46:
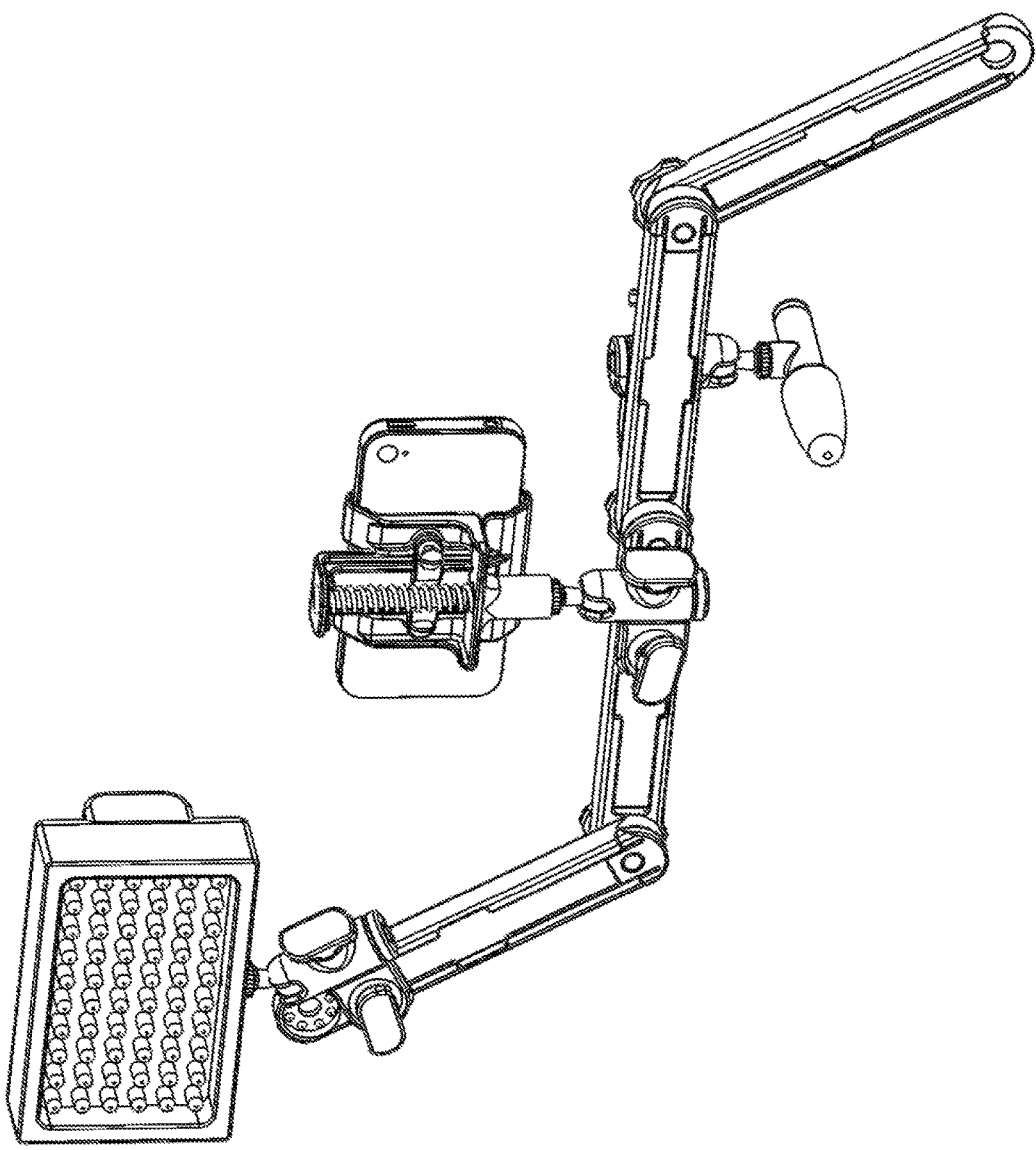
FIG. 46 shows a Z configuration of a preferred embodiment of the device securing a smart phone integrated digital camera and an accessory.

The device may preferably allow a user to generate a variety of different configurations that can be useful when photographing or filming a subject. In some embodiments, the device may be configured linearly to replicate a mono pod/pole or extension arm, as shown in FIGS. 15-16. This allows a user to extend the reach of a camera or videocamera for outcomes such as increasing the height of or changing the angle of the camera or videocamera while in use. In other embodiments, the device may be configured to generate a 90 degree angle that allows for two-handed operation, as shown in FIGS. 17-23. In other embodiments, the device may be configured such that the user may brace the device against the user's arm and chest such that the device serves as a shoulder support, as shown in FIGS. 24-26. In other embodiments, the device may be mounted to a tripod for hands-free photography or videography, as shown in FIGS. 27-28. In other embodiments, the device may be mounting to an object or surface such as a desk or wall using a clamp and a base plate, enabling the user to use the device in applications such as hands-free videoconferencing. In other embodiments, the device may be used as a hands-free body mount, enabling the user to photograph himself/herself or a subject. In other embodiments, the device may be mounted to a smooth surface via a suction cup.

In preferred embodiments, a camera, camera accessory, videocamera, or video accessory may be mounted to the device anywhere along the mounting channel, thereby greatly increasing customizability.

The device significantly enhances a user's ability to use a portable electronic device such as a cellular phone, smart phone, or tablet as a camera or videocamera. The device allows the user to generate a variety of configurations using a single highly portable mounting device. In addition to its use with portable electronic devices, the device also allows similar customizable configuration of stand-alone cameras and videocameras, thereby providing a user with additional functionality without requiring a separate device to achieve such functionality.

Examples

Figure 48A:
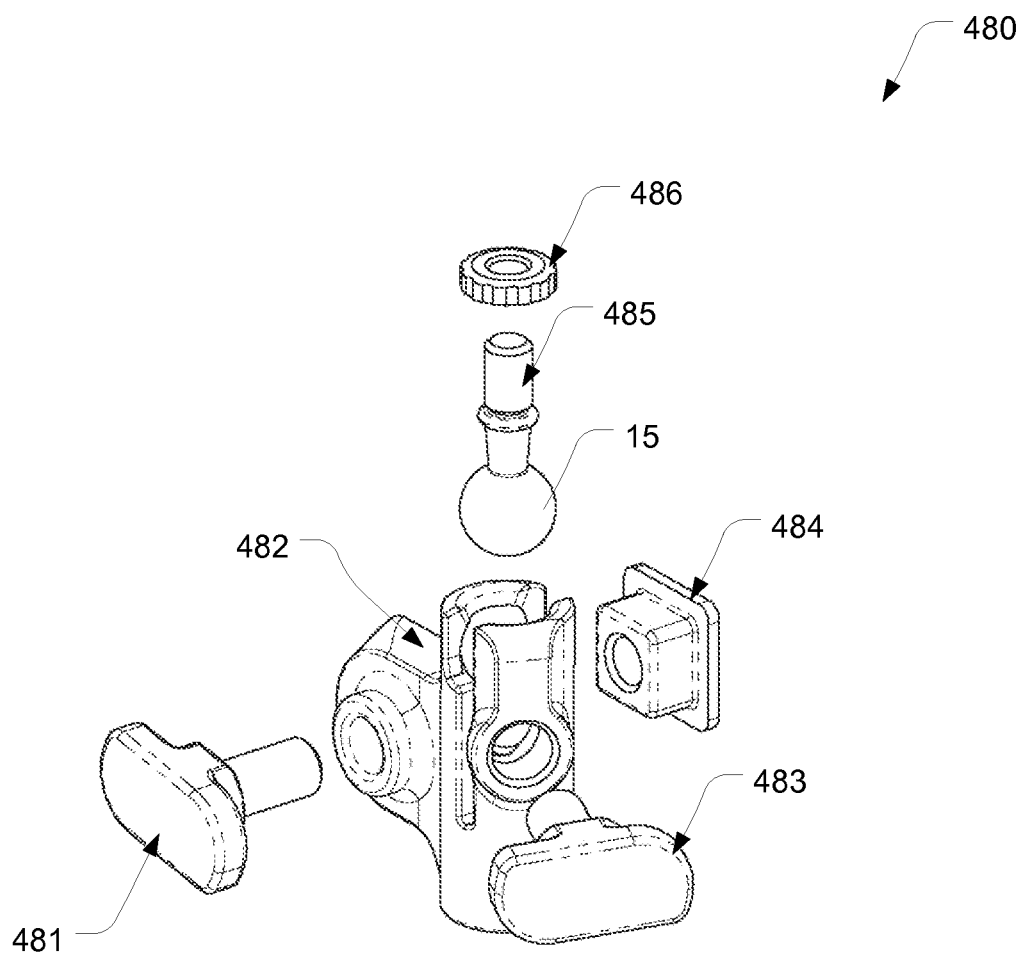
FIG. 48A is an exploded view of an exemplary ball joint mount.

An example of the ball joint mount is shown in FIGS. 48A-F. FIG. 48A shows an exploded view of an exemplary ball joint mount 480 comprising a main pivot body 482; a clamp T block 484; a clamp fastener 481; a ball joint stud 485; a ball joint fastener 483; and a ball joint nut 486.

Figure 48B:
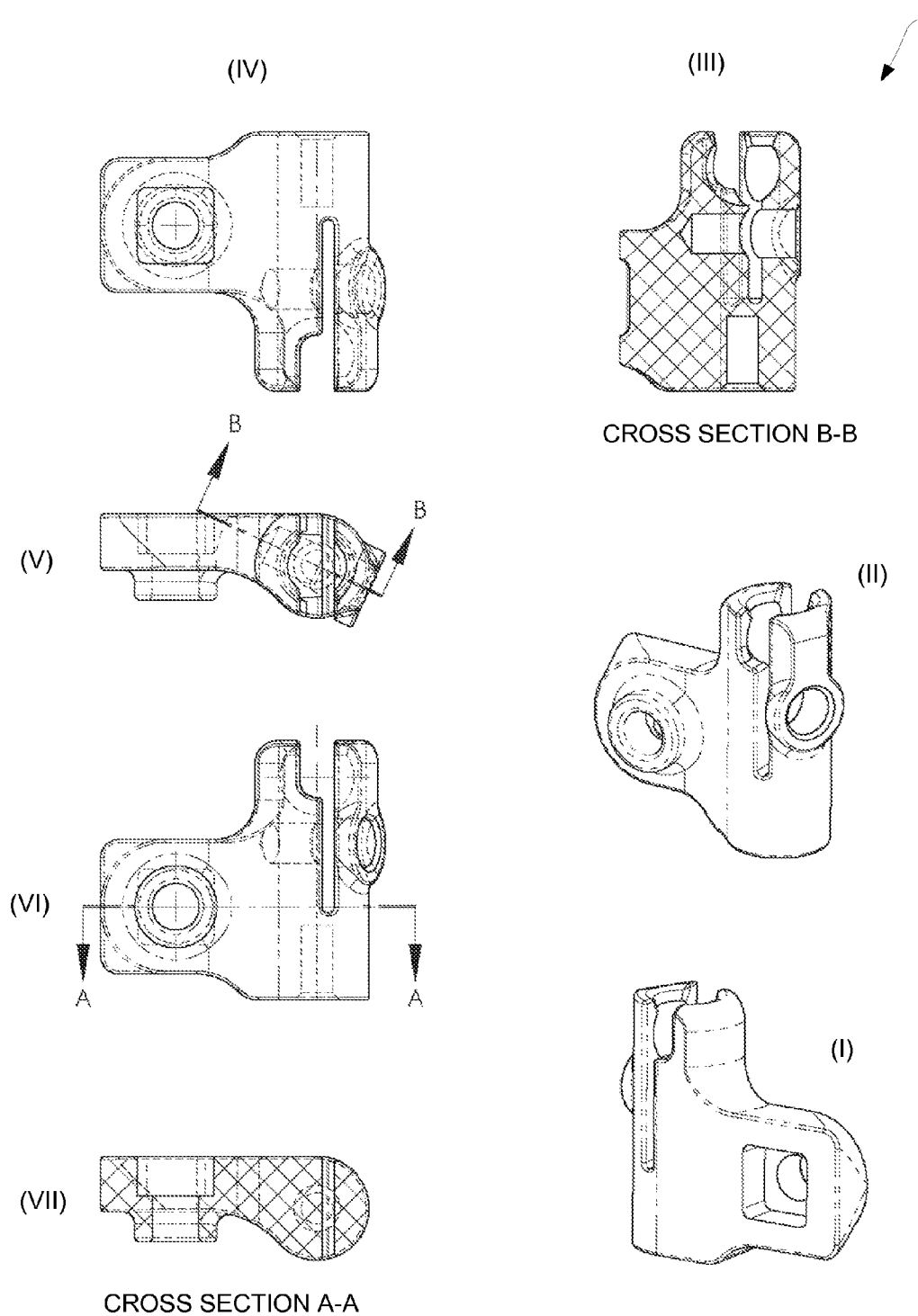
FIG. 48B presents different views of the main pivot body of the exemplary ball joint mount.

FIG. 48B presents different views of the main pivot body of the exemplary ball joint mount as follows: (I) is an illustration of the back side perspective view; (II) is an illustration of the front side perspective view; (III) is an illustration of cross section B-B; (IV) is an illustration of the back side elevational view; (V) is an illustration of the top side elevational view; (VI) is an illustration of the front side elevational view; and (VII) is an illustration of cross section A-A.

Figures 48C, 48D:
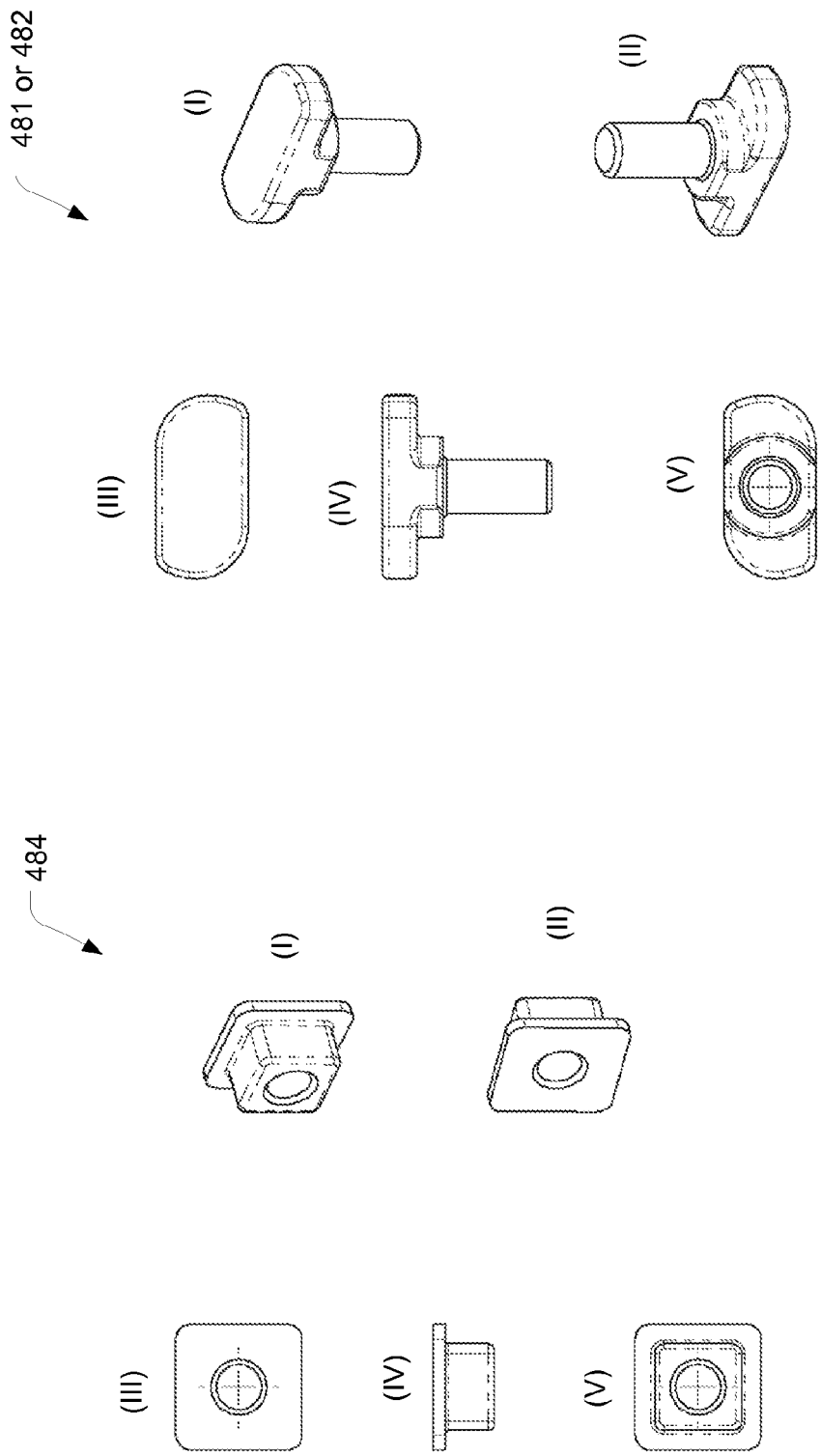
FIG. 48C presents different views of the clamp T block of the exemplary ball joint mount.
FIG. 48D presents different views of thumb screw of the exemplary ball joint mount.

FIG. 48C presents different views of the clamp T block of the exemplary ball joint mount as follows: (I) is an illustration of the back side perspective view; (II) is an illustration of the top side perspective view; (III) is an illustration of the top side elevational view; (IV) is an illustration of a side elevational view; and (V) is an illustration of the back side elevational view.

FIG. 48D presents different views of thumb screw of the exemplary ball joint mount as follows: (I) is an illustration of the top side perspective view; (II) is an illustration of the bottom side perspective view; (III) is an illustration of the top side elevational view; (IV) is an illustration of a side elevational view; and (V) is an illustration of the back side elevational view.

Figures 48E, 48F:
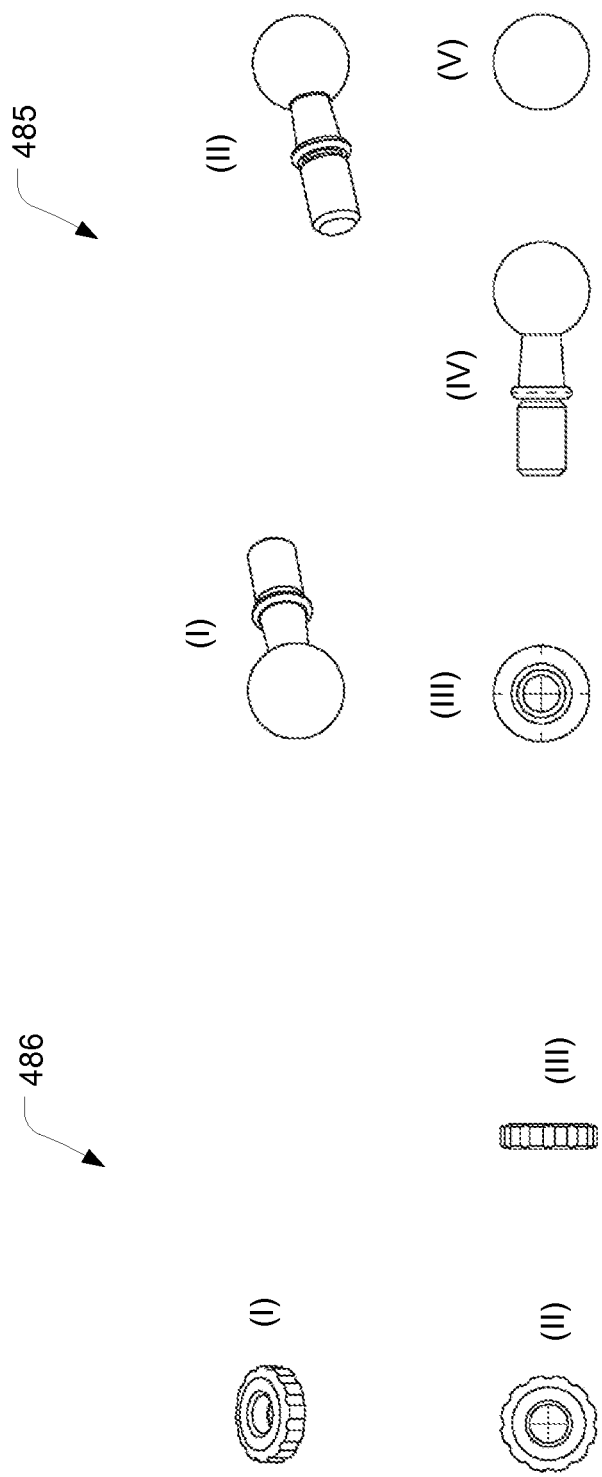
FIG. 48E presents different views of the jam nut of the exemplary ball joint mount.
FIG. 48F presents different views of the ball joint stud of the exemplary ball joint mount.

FIG. 48E presents different views of the jam nut of the exemplary ball joint mount as follows: (I) is an illustration of the top side perspective view; (II) is an illustration of the top side elevational view; and (IV) is an illustration of a side elevational view.

FIG. 48F presents different views of the ball joint stud of the exemplary ball joint mount as follows: (I) is an illustration of the top side perspective view; (II) is an illustration of the bottom side perspective view; (III) is an illustration of the top side elevational view; (IV) is an illustration of a side elevational view; and (V) is an illustration of the back side elevational view.

Figure 49A:
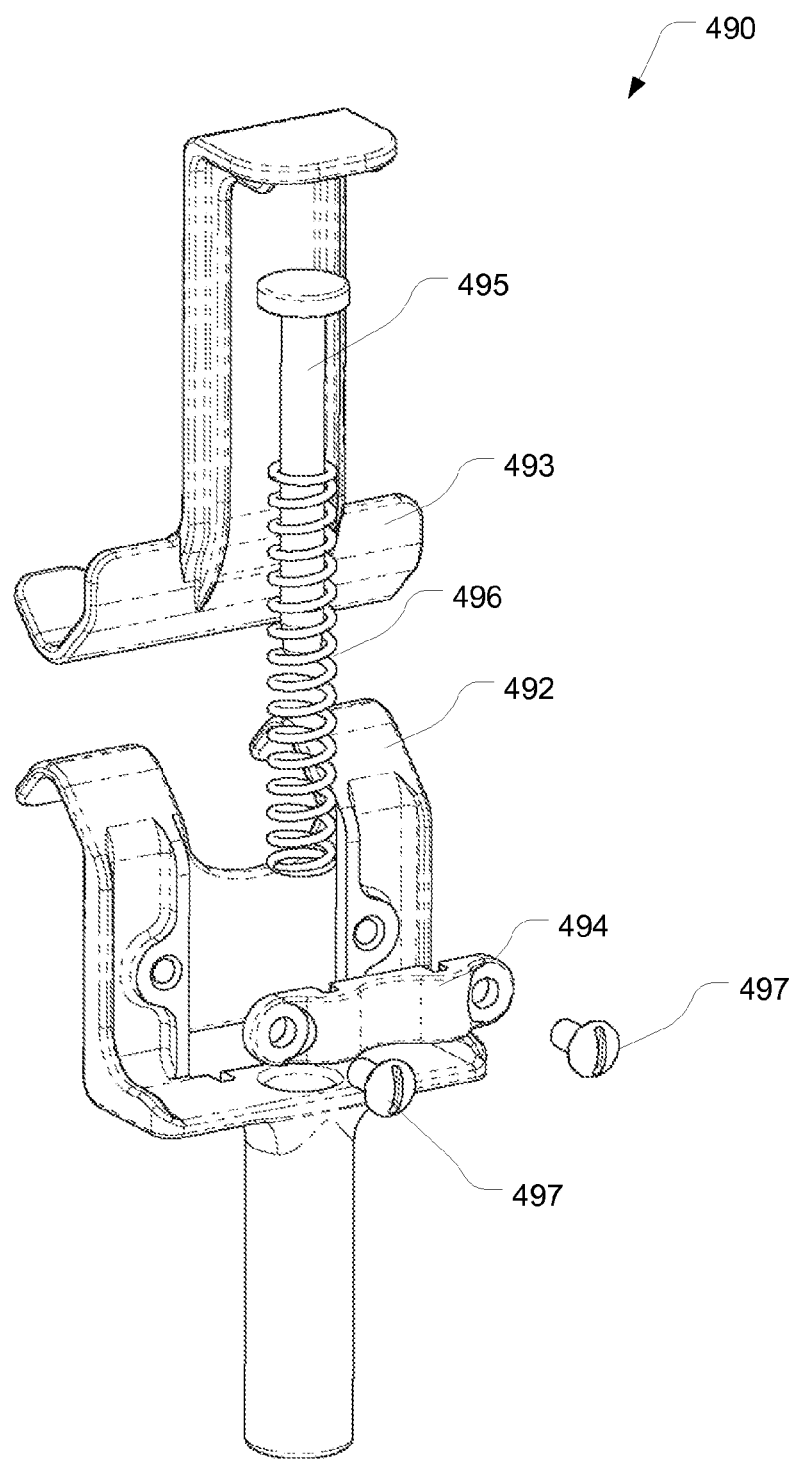
FIG. 49A is an exploded view of an exemplary spring clamp.

An example of the spring clamp is shown in FIG. 49A-E. FIG. 49A shows an exploded view of an exemplary spring clamp 490 comprising a main clamp 492; a bottom clamp 493; a retainer 494; a spring guide 495; spring 496; and retainer screws 497.

Figure 49B:
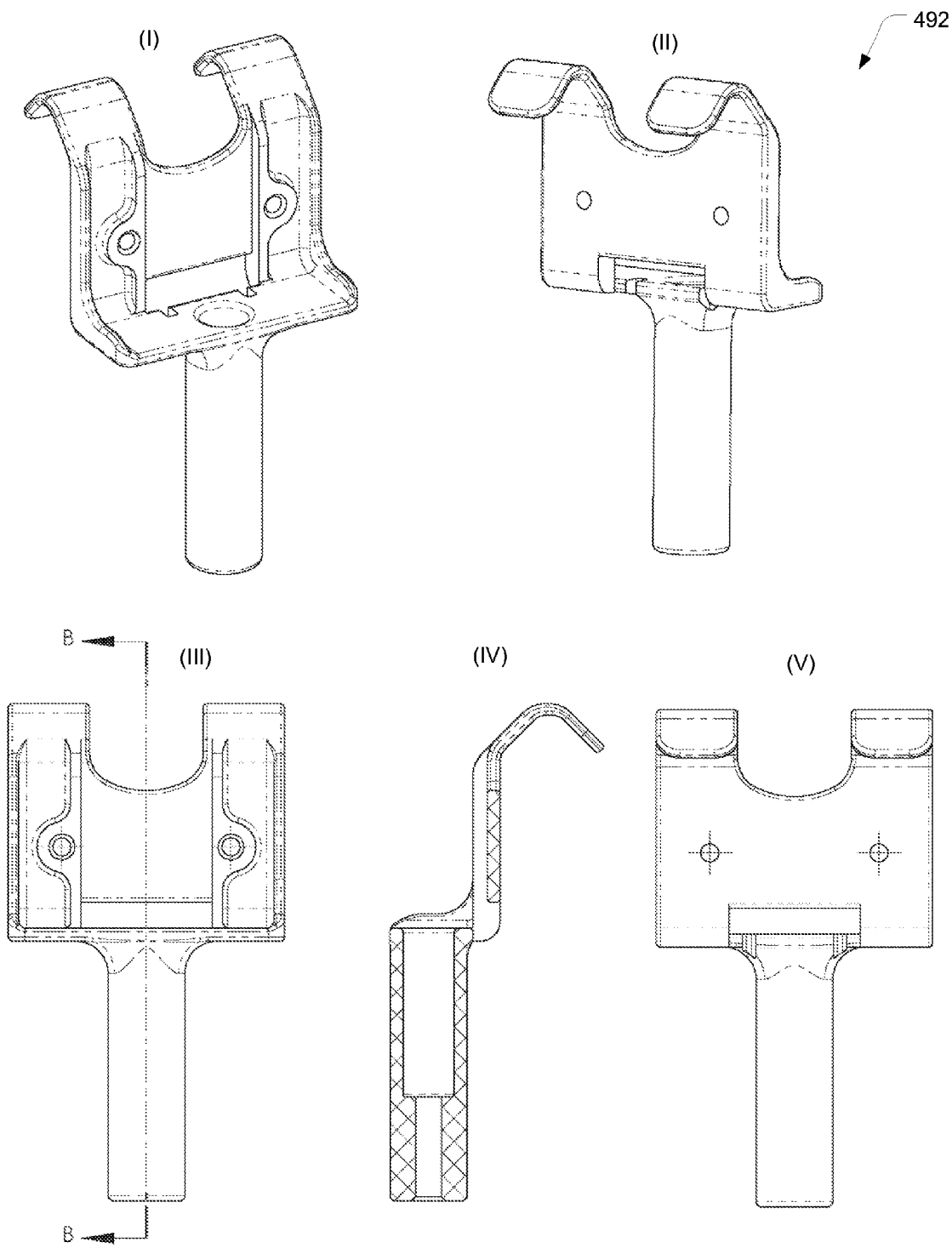
FIG. 49B presents different views of the main clamp of the exemplary spring clamp.

FIG. 49B presents different views of the main clamp of the exemplary spring clamp as follows: (I) is an illustration of the front side perspective view; (II) is an illustration of the back side perspective view; (III) is an illustration of the front side elevational view; (IV) is an illustration of cross-section B-B; and (V) is an illustration of the back side elevational view.

Figure 49C:
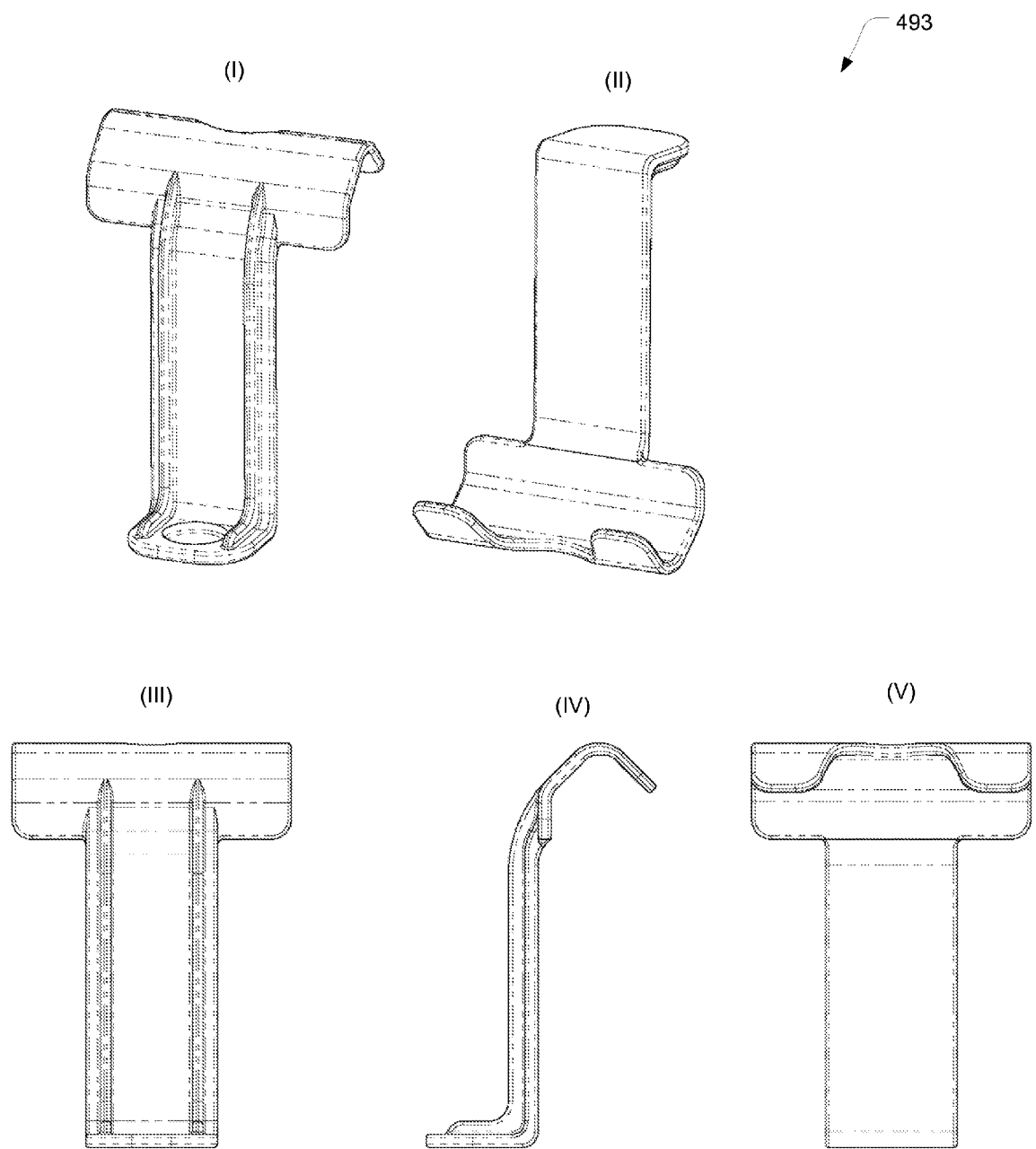
FIG. 49C presents different views of the bottom clamp of the exemplary spring clamp.

FIG. 49C presents different views of the bottom clamp of the exemplary spring clamp as follows: (I) is an illustration of the front side perspective view; (II) is an illustration of the back side perspective view; (III) is an illustration of the front side elevational view; (IV) is an illustration of a left or right side elevational view; and (V) is an illustration of the back side elevational view.

FIG. 49D presents different views of the spring guide of the exemplary spring clamp as follows: (I) is an illustration of a perspective view; (II) is an illustration of the top side elevational view; (III) is an illustration of cross-section A-A.

FIG. 49E presents different views of the retainer of the exemplary spring clamp as follows: (I) is an illustration of the front side perspective view; (II) is an illustration of the back side perspective view; (III) is an illustration of the top side elevational view; (IV) is an illustration of the left or right side elevational view; and (V) is an illustration of the front or back side elevational view.

The disclosure and examples above are intended to be illustrative and are not intended to limit or otherwise restrict the invention. Numerous variations and modifications will become apparent to those skilled in the art upon full appreciation of the above disclosure.

For example, one skilled in the art will understand that the components and parts of the camera mounting device may be modified by scaling up or scaling down the dimensions of the device without altering the dimensional ratios of these components and parts, and will also understand that the dimensional ratios of the components and parts of the camera mounting device may be altered significantly without affecting its functionality. Examples of such scaling or altering of the dimensional ratios include scaling the device up or down in size by a factor of five or ten, or altering the ratio of the components of the device such as using a larger or smaller fastener compared to the mounting segment, respectively.

It is intended that the following claims be interpreted to embrace all such variations and modifications.

All references cited herein are expressly incorporated by reference.

What is claimed is:

1. A device for mounting a camera comprising:
a first and second mounting segments, wherein each of said first and second mounting segments comprises a first mounting channel on a front side and a second mounting channel on a backside, wherein each of said first and second mounting channels is configured as a camera accessory shoe that runs approximately a length of the mounting segment;
a spacer locker between a recessed section on said backside of a second end of said first mounting segment and a recessed section on said front side of a first end of said second mounting segment, wherein said spacer locker and said backside of said second end of said first mounting segment and said front side of said first end of said second mounting segment couple to form an adjustable interlock; and
a fastener coupling said second end of said first mounting segment to said first end of said second mounting segment through said spacer locker.

2. The device of claim 1, wherein said spacer locker comprises a plurality of recesses of said interlock on its front side and backside and wherein backside of said second end of said first mounting segment and said front side of said first end of said second mounting segment comprises a plurality of projections of said interlock.

3. The device of claim 1, wherein said spacer locker comprises a plurality of projections of said interlock on its front side and backside and wherein said backside of said second end of said first mounting segment and said front side of said first end of said second mounting segment comprises a plurality of recesses of said interlock.

4. The device of claim 1, wherein said fastener comprises a threaded thumb screw coupled to a threaded end cap, wherein the threaded end cap is secured onto said backside of said first end of said second mounting segment.

5. The device of claim 1, wherein the first mounting channel comprises a clamp access site.

6. The device of claim 1, wherein the second mounting channel comprises a clamp access site.

7. The device of claim 1, further comprising a ball joint mount coupled to said first or second mounting channels.

8. The device of claim 1, further comprising a spring clamp coupled to said first or second mounting segments via a ball joint mount.

9. A device for mounting a camera comprising:
a first and second mounting segments, wherein each of said first and second mounting segments comprises a first mounting channel on a front side and a second mounting channel on a backside, wherein each of said first and second mounting channels is configured as a camera accessory shoe that runs approximately a length of the mounting segment;
a spacer locker house between a recessed section on said backside of a second end of said first mounting segment and a recessed section on said front side of a first end of said second mounting segment, wherein said spacer locker and said backside of said second end of said first mounting segment and said front side of said first end of said second mounting segment couple to form an adjustable interlock; and
a threaded thumb screw coupled through said first mounting segment, a hole in said spacer locker, and said second mounting segment to a threaded end cap, wherein the threaded end cap is secured onto said backside of said first end of said second mounting segment.

10. The device of claim 9, wherein said spacer locker comprises a plurality of recesses of said interlock on its front side and backside and wherein backside of said second end of said first mounting segment and said front side of said first end of said second mounting segment comprises a plurality of projections of said interlock.

11. The device of claim 9, wherein said spacer locker comprises a plurality of projections of said interlock on its front side and backside and wherein said backside of said second end of said first mounting segment and said front side of said first end of said second mounting segment comprises a plurality of recesses of said interlock.

12. The device of claim 9, wherein the first mounting channel comprises a clamp access site.

13. The device of claim 9, wherein the second mounting channel comprises a clamp access site.

14. The device of claim 9, further comprising a ball joint mount coupled to said first or second mounting channels.

15. The device of claim 9, further comprising a spring clamp coupled to said first or second mounting segments via a ball joint mount.

16. A device for mounting a camera comprising:
a first and second mounting segments with each having a front side and a back side, wherein the front side includes a thumb screw retainer section at a first end and a first spacer locker retainer section at its second end, wherein the back side includes a threaded end cap retainer section at the second end and a second spacer locker retainer section at the first end, wherein the front side comprises a first mounting channel that runs a length from approximately the first spacer locker retainer section to said thumb screw retainer section, and wherein the back side comprises a second mounting channel that runs a length from approximately the second spacer locker retainer section to said threaded end cap retainer section;
a spacer locker housed between said second spacer locker retainer section on said back side of the first mounting segment and said first spacer locker retainer section on said front side of the second mounting segment, wherein said spacer locker and said and said first and second spacer locker retainer sections couple to form an adjustable interlock; and
a threaded thumb screw coupled through said first mounting segment, a hole in said spacer locker, and said second mounting segment to a threaded end cap, wherein the threaded end cap is coupled to said threaded end cap retainer section of said second mounting segment.

17. The device of claim 16, wherein said spacer locker comprises a plurality of recesses of said interlock on its front and back sides, wherein the first and second spacer locker retainer sections include a plurality of projections of said interlock.

18. The device of claim 16, wherein said spacer locker comprises a plurality of projections of said interlock on its front and back sides, wherein the first and second spacer locker retainer sections include a plurality of recesses of said interlock.

* * * * *